(12) United States Patent
Cruz-Hernandez et al.

(10) Patent No.: US 9,939,900 B2
(45) Date of Patent: *Apr. 10, 2018

(54) SYSTEM AND METHOD FOR A HAPTICALLY-ENABLED DEFORMABLE SURFACE

(71) Applicant: Immersion Corporation, San Jose, CA (US)

(72) Inventors: Juan Manuel Cruz-Hernandez, Montreal (CA); Danny Grant, Laval (CA); Vincent Levesque, Montreal (CA); Ali Modarres, Montreal (CA)

(73) Assignee: Immersion Corporation, San Jose, CA (US)

( * ) Notice: Subject to any disclaimer, the term of this patent is extended or adjusted under 35 U.S.C. 154(b) by 490 days.

This patent is subject to a terminal disclaimer.

(21) Appl. No.: 14/222,518

(22) Filed: Mar. 21, 2014

(65) Prior Publication Data

US 2014/0320431 A1 Oct. 30, 2014

Related U.S. Application Data

(60) Provisional application No. 61/922,536, filed on Dec. 31, 2013, provisional application No. 61/816,605, filed on Apr. 26, 2013.

(51) Int. Cl.
*G06F 3/01* (2006.01)
*G06F 3/041* (2006.01)

(52) U.S. Cl.
CPC .............. *G06F 3/016* (2013.01); *G06F 3/041* (2013.01)

(58) Field of Classification Search
CPC ........ G06F 3/016; G06F 3/0416; G06F 3/041; G06F 3/046; G06F 3/0414; G06F 3/0487; G06F 3/0488

(Continued)

(56) References Cited

U.S. PATENT DOCUMENTS 4,330,730 A 5/1982 Kurz et al.
5,149,918 A 9/1992 Kozik et al.
(Continued)

FOREIGN PATENT DOCUMENTS

CN 101436099 A 5/2009
CN 101739171 A 6/2010
(Continued)

OTHER PUBLICATIONS

Kane, S. et al., Bonfire: A Nomadic System for Hybrid Laptop-Tabletop Interaction, Proceeding—UIST '09 Proceedings of the 22nd annual ACM symposium on User interface software and technology, pp. 129-138, 2009.

(Continued)

*Primary Examiner* — Fred Tzeng
(74) *Attorney, Agent, or Firm* — Kilpatrick Townsend & Stockton LLP

(57) ABSTRACT

One illustrative system disclosed herein includes a first haptic output device configured to receive a first haptic signal and output a first haptic effect to a deformable surface and a second haptic output device configured to receive a second haptic signal and output a second haptic effect to the deformable surface. The illustrative system further includes a processor coupled to the first haptic output device and the second haptic output device, the processor configured to: determine an event, determine a first haptic effect and a second haptic effect based at least in part on the event, transmit a first haptic signal associated with the first haptic effect to the first haptic output device, and transmit a second haptic signal associated with the second haptic effect to the second haptic output device.

20 Claims, 8 Drawing Sheets

(58) Field of Classification Search
USPC .......................................................... 345/173
See application file for complete search history.

(56) References Cited

U.S. PATENT DOCUMENTS

| | | | |
|---|---|---|---|
| 6,160,540 | A | 12/2000 | Fishkin et al. |
| 6,337,678 | B1 | 1/2002 | Fish |
| 6,429,846 | B2 | 8/2002 | Rosenberg et al. |
| 6,703,924 | B2 | 3/2004 | Tecu et al. |
| 6,803,924 | B1 | 10/2004 | Snibbe et al. |
| 6,819,304 | B2 | 11/2004 | Branson |
| 6,819,312 | B2 | 11/2004 | Fish |
| 7,008,342 | B2 | 8/2006 | Rekimoto et al. |
| 7,196,688 | B2 | 3/2007 | Schena |
| 7,205,978 | B2 | 4/2007 | Poupyrev et al. |
| 7,446,456 | B2 | 11/2008 | Maruyama et al. |
| 7,456,823 | B2 | 11/2008 | Poupyrev et al. |
| 7,522,152 | B2 | 4/2009 | Olien et al. |
| 7,554,246 | B2 | 6/2009 | Maruyama et al. |
| 7,663,604 | B2 | 2/2010 | Maruyama et al. |
| 7,755,607 | B2 | 7/2010 | Poupyrev et al. |
| 8,427,433 | B2 | 4/2013 | Edwards et al. |
| 8,749,495 | B2 | 6/2014 | Grant et al. |
| 8,836,611 | B2 | 9/2014 | Kilpatrick, II et al. |
| 8,902,050 | B2 | 12/2014 | Heubel et al. |
| 9,323,326 | B2* | 4/2016 | Cruz-Hernandez ...... G06F 3/044 |
| 9,405,368 | B2 | 8/2016 | Modarres et al. |
| 9,639,158 | B2* | 5/2017 | Levesque ................ G06F 3/016 |
| 9,823,833 | B2 | 11/2017 | Grant et al. |
| 2002/0021277 | A1* | 2/2002 | Kramer .................. G06F 3/016 345/156 |
| 2002/0044132 | A1 | 4/2002 | Fish |
| 2002/0108439 | A1 | 8/2002 | Whitehead |
| 2003/0174121 | A1 | 9/2003 | Poupyrev et al. |
| 2003/0179190 | A1 | 9/2003 | Franzen |
| 2004/0008191 | A1 | 1/2004 | Poupyrev et al. |
| 2004/0041800 | A1 | 3/2004 | Daniels |
| 2004/0217877 | A1 | 11/2004 | Kokonaski et al. |
| 2004/0233161 | A1 | 11/2004 | Shahoian et al. |
| 2004/0268391 | A1 | 12/2004 | Clercq et al. |
| 2005/0030292 | A1 | 2/2005 | Diederiks |
| 2005/0040962 | A1 | 2/2005 | Funkhouser et al. |
| 2005/0057528 | A1 | 3/2005 | Kleen |
| 2006/0099808 | A1 | 5/2006 | Kondo |
| 2006/0167576 | A1 | 7/2006 | Rosenberg |
| 2006/0194619 | A1 | 8/2006 | Wilcox et al. |
| 2006/0211217 | A1 | 9/2006 | Xu et al. |
| 2006/0267944 | A1 | 11/2006 | Rosenberg et al. |
| 2007/0118043 | A1 | 5/2007 | Oliver et al. |
| 2007/0211036 | A1 | 9/2007 | Perkins |
| 2007/0236450 | A1 | 10/2007 | Colgate et al. |
| 2008/0051919 | A1 | 2/2008 | Sakai et al. |
| 2008/0068348 | A1 | 3/2008 | Rosenberg et al. |
| 2008/0088580 | A1 | 4/2008 | Poupyrev et al. |
| 2008/0097633 | A1 | 4/2008 | Jochelson et al. |
| 2008/0261057 | A1 | 10/2008 | Slobodin |
| 2008/0266273 | A1 | 10/2008 | Slobodin et al. |
| 2008/0297878 | A1 | 12/2008 | Brown et al. |
| 2008/0303782 | A1 | 12/2008 | Grant et al. |
| 2009/0079550 | A1 | 3/2009 | Makinen et al. |
| 2009/0088877 | A1 | 4/2009 | Terauchi et al. |
| 2009/0096632 | A1 | 4/2009 | Ullrich et al. |
| 2009/0109007 | A1 | 4/2009 | Makinen et al. |
| 2010/0013761 | A1* | 1/2010 | Birnbaum .............. G06F 1/1613 345/156 |
| 2010/0056223 | A1 | 3/2010 | Choi et al. |
| 2010/0085169 | A1 | 4/2010 | Poupyrev et al. |
| 2010/0090813 | A1* | 4/2010 | Je ......................... G06F 3/016 340/407.2 |
| 2010/0127819 | A1 | 5/2010 | Radivojevic et al. |
| 2010/0225600 | A1* | 9/2010 | Dai ........................ G06F 3/016 345/173 |
| 2010/0231367 | A1 | 9/2010 | Cruz-Hernandez et al. |
| 2010/0231508 | A1 | 9/2010 | Cruz-Hernandez et al. |
| 2010/0231539 | A1 | 9/2010 | Cruz-Hernandez et al. |
| 2010/0231540 | A1 | 9/2010 | Cruz-Hernandez et al. |
| 2010/0231541 | A1 | 9/2010 | Cruz-Hernandez et al. |
| 2010/0231550 | A1* | 9/2010 | Cruz-Hernandez ...... G06F 3/0488 345/174 |
| 2010/2568114 | | 9/2010 | Vartanian et al. |
| 2010/0283731 | A1 | 11/2010 | Grant et al. |
| 2010/0302199 | A1* | 12/2010 | Taylor .................... G06F 3/046 345/174 |
| 2011/0021272 | A1* | 1/2011 | Grant ..................... A63F 13/10 463/30 |
| 2011/0022594 | A1 | 1/2011 | Takatsuka et al. |
| 2011/0093100 | A1 | 4/2011 | Ramsay |
| 2011/0191674 | A1* | 8/2011 | Rawley .................. G06F 3/016 715/702 |
| 2011/0227872 | A1* | 9/2011 | Huska .................... G06F 3/016 345/174 |
| 2011/0267294 | A1 | 11/2011 | Kildal |
| 2012/0133494 | A1 | 5/2012 | Cruz-Hernandez et al. |
| 2012/0139844 | A1* | 6/2012 | Ramstein ............... G06F 3/016 345/173 |
| 2012/0169609 | A1* | 7/2012 | Britton .................. G06F 3/0488 345/173 |
| 2012/0229400 | A1 | 9/2012 | Birnbaum et al. |
| 2012/0268412 | A1 | 10/2012 | Cruz-Hernandez et al. |
| 2013/0009882 | A1* | 1/2013 | Salmela ................. G06F 3/016 345/173 |
| 2013/0009892 | A1* | 1/2013 | Salmela ................. G06F 3/016 345/173 |
| 2013/0076649 | A1 | 3/2013 | Myers et al. |
| 2013/0201115 | A1* | 8/2013 | Heubel .................. G06F 3/0487 345/173 |
| 2013/0241860 | A1 | 9/2013 | Ciesla et al. |
| 2013/0265262 | A1 | 10/2013 | Jung et al. |
| 2013/0293453 | A1 | 11/2013 | Hwang |
| 2013/0335375 | A1 | 12/2013 | Nishikawa et al. |
| 2014/0049137 | A1 | 2/2014 | Ando et al. |
| 2014/0049463 | A1 | 2/2014 | Seo et al. |
| 2014/0055345 | A1 | 2/2014 | Seo et al. |
| 2014/0055358 | A1 | 2/2014 | Birnbaum et al. |
| 2014/0098028 | A1 | 4/2014 | Kwak et al. |
| 2014/0253302 | A1* | 9/2014 | Levesque ............... G06F 3/016 340/407.1 |
| 2014/0267013 | A1* | 9/2014 | Grant ..................... G06F 1/1626 345/156 |
| 2014/0267065 | A1* | 9/2014 | Levesque ............... G06F 3/016 345/173 |
| 2014/0306891 | A1 | 10/2014 | Latta |
| 2014/0313142 | A1 | 10/2014 | Yairi |
| 2014/0320393 | A1 | 10/2014 | Modarres |
| 2014/0320396 | A1 | 10/2014 | Modarres et al. |
| 2014/0320431 | A1 | 10/2014 | Cruz Hernandez et al. |
| 2014/0320435 | A1 | 10/2014 | Modarres et al. |
| 2014/0362014 | A1 | 12/2014 | Ullrich |
| 2015/0009168 | A1 | 1/2015 | Levesque et al. |
| 2015/0022472 | A1 | 1/2015 | Jung et al. |
| 2015/0054727 | A1* | 2/2015 | Saboune ................. G06F 3/0414 345/156 |
| 2015/0145656 | A1 | 5/2015 | Levesque et al. |
| 2015/0145657 | A1 | 5/2015 | Levesque et al. |
| 2015/0189223 | A1 | 7/2015 | Levesque et al. |
| 2015/0286288 | A1 | 10/2015 | Lee et al. |
| 2015/0323993 | A1 | 11/2015 | Levesque et al. |
| 2016/0011660 | A1 | 1/2016 | Wieder |
| 2016/0018891 | A1 | 1/2016 | Levesque et al. |
| 2016/0054799 | A1 | 2/2016 | Levesque et al. |
| 2016/0147333 | A1 | 5/2016 | Levesque |

FOREIGN PATENT DOCUMENTS

| | | |
|---|---|---|
| CN | 102067068 A | 5/2011 |
| CN | 102209946 A | 10/2011 |
| EP | 2 626 775 | 8/2013 |
| EP | 2 703 952 | 3/2014 |
| EP | 2 750 015 | 7/2014 |
| JP | H11203020 | 7/1999 |
| JP | 2000-148393 | 5/2000 |
| JP | 2003-060251 | 2/2003 |
| JP | 2003-280546 | 10/2003 |

(56) References Cited

FOREIGN PATENT DOCUMENTS

| JP | 2003-288158 | | 10/2003 |
|---|---|---|---|
| JP | 2004-071765 | | 3/2004 |
| JP | 2005-114796 | | 4/2005 |
| JP | 2006-154380 | | 6/2006 |
| JP | 2007-121765 | | 5/2007 |
| JP | 2010-5036579 | | 2/2010 |
| JP | 2010-529555 | A | 8/2010 |
| JP | 2010-282259 | A | 12/2010 |
| JP | 2012-502321 | A | 1/2012 |
| JP | 2012-520523 | A | 9/2012 |
| JP | 2012-242871 | A | 12/2012 |
| JP | 2013-509652 | A | 3/2013 |
| WO | WO 2009/037379 | | 3/2009 |
| WO | WO 2009/141502 | | 11/2009 |
| WO | 2010/028402 | A1 | 3/2010 |
| WO | 2010/105004 | A1 | 9/2010 |
| WO | 2011/059703 | A1 | 5/2011 |
| WO | WO 2013/004919 | | 1/2013 |
| WO | WO 2013/004919 | A1 | 1/2013 |

OTHER PUBLICATIONS

U.S. Appl. No. 14/106,275, filed Dec. 13, 2013, Levesque et al.
U.S. Appl. No. 14/585,752, filed Dec. 30, 2014, Levesque et al.
U.S. Appl. No. 14/275,216, filed May 12, 2014, Levesque et al.
Linder, N. et al., LuminAR: Portable Robotic Augmented Reality Interface Design and Prototype, Proceeding—UIST '10 Adjunct proceedings of the 23nd annual ACM symposium on User interface software and technology, pp. 395-396, 2010.
Willis, K. et al., SideBySide: Ad-hoc Multi-user Interaction with Handheld Projectors, UIST '11 Proceedings of the 24th annual ACM symposium on User interface software and technology, pp. 431-440, 2011.
European Patent Office, European Search Report, Application No. 15180441 dated Dec. 11, 2015.
Mistry, P. et al., SixthSense: A Wearable Gestural Interface, Proceeding—SIGGRAPH Asia '09 ACM SIGGRAPH Asia 2009 Sketches, Article No. 11, 2009.
Visual Planet: Touch Foil, 5 pages, Sep. 9, 2007.
Roudaut, A. et al., Morphees: Towards High "Shape Resolution" in Self-Actuated Flexible Mobile Device, CHI'13, Apr. 27-May 2, 2013, Paris France.
Ahmaniemi et al., What is a device bend gesture really good for? CHI 2014, One of a CHInd, Toronto, ON, Canada, Apr. 26-May 1, 2014, pp. 3503-3512.
E-Ink Electronic Paper Display, 3 pages, Sep. 9, 2007.
NEC's Flexible Battery, 3 pages, Sep. 9, 2007.
Siemens Wafer-Thin Color Displays for Packaging, 2 pages, Feb. 21, 2007.
United States Patent and Trademark Office, Office Action, U.S. Appl. No. 14/552,987 dated Apr. 6, 2016.
Xerox Electronic Reusable Paper, 2 pages, Feb. 21, 2007.
Kane, S. et al., Bonfire: A Nomadic System for Hybrid Laptop-Tabletop Interaction, Proceeding—UIST '09 Proceedings of the 22$^{nd}$ annual ACM symposium on User interface software and technology, pp. 129-138, 2009.
Levesque, V. et al., Exploring the Design Space of Programmable Friction for Scrolling Interactions, 2012 IEEE Haptics Symposium (HAPTICS), pp. 23-30, Mar. 2012.
Linder, N. et al., LuminAr: Portable Robotic Augmented Reality Interface Design and Prototype, Proceeding—UIST '10 Adjunct proceedings of the 23$^{rd}$ annual ACM symposium on User interface software and technology, pp. 395-396, 2010.
Sodhi, R. et al., AIREAL: Interactive Tactile Experiences in Free Air, SIGGRAPH '13, Jul. 21-25, 2013, Anaheim, CA, USA.
Willis, K. et al., SideBySide: Ad-hoc Multi-user Interaction with Handheld Projectors, UIST '11 Proceedings of the 24$^{th}$ annual ACM symposium on User Interface software and technology, pp. 431-440, 2011.
Haptic Feedback for Privacy Awareness, Disclosed anonymously.
Haptic Confirmation of User Input for Head-Mounted Displays, Disclosed anonymously.
Haptic Feedback on Head-Mounted Displays, Disclosed Anonymously.
European Patent Office, Extended European Search Report, European Application No. 14164621, dated Sep. 18, 2014.
European Patent Office, European Search Report, Application No. 15193492 dated May 19, 2016.
International Search Report and Written Opinion as issued for International Application No. PCT/US12/33743, dated Jul. 6, 2012.
Smith, N. "Feel the future: Touch screens that touch back," MSNBC [online], [retrieved Apr. 21, 2011]. Retrieved from the Internet <URL:http://www.msnbc.msn.com/clearprint/CleanPrintProxy.asp?unique=1303408902146>.
Greene, K., "A Touch Screen with Texture," Technology Review [online], [retrieved Apr. 21, 2011]. Retrieved from the Internet <URL:http://www.technologyreview.com/printer_friendly_article.aspx?id=26506>.
Bonderud, D., "Nokia Files Patent to Make Phones Digitally Stimulating," InventorSpot.com [online], [retrieved Apr. 21, 2011]. Retrieved from the Internet <URL:http://inventorspot.com/articles/nokia_files_patent_make_phones_digitally_stimulating>.
Marks, P., "Nokia touchscreen creates texture illusion," New Scientist [online], [retrieved Apr. 21, 2011]. Retrieved from the Internet <URL:http://www.newscientist.com/article/dn19510-nokia-touch-screen-creates-texture-illusion.html.
European Extended Search Report dated Jan. 22, 2015 for corresponding European Application 12773915.9.
Morphees: Shape-shifting mobile devices, BIG Bristol Interaction Graphics, web page at http://big.cs.bris.ac.uk/projects/morphees, as available via the Internet and printed Dec. 5, 2014.
Bau, O. et al., TeslaTouch: Electrovibration for Touch Surfaces, UIST '10 Proceedings of the 23nd annual ACM symposium on User interface software and technology, pp. 283-292, 2010.
Iwamoto, T. et al., High Resolution Tactile Display Using Acoustic Radiation Pressure, SCE Annual Conference in Sapporo, pp. 1239-1244, 2004.
State Intellectual Property Office of the Peoples Republic of China Application No. 201410180557.8, Office Action dated Jun. 2, 2017, 7 pages.
State Intellectual Property Office of the Peoples Republic of China Application No. 201410260402.5, Office Action dated Jun. 26, 2017.
U.S. Appl. No. 15/355,817, Non-Final Office Action dated Oct. 5, 2017, 14 pages.
State Intellectual Property Office of the Peoples Republic of China Application No. 201410180557.8, Second Office Action dated Dec. 21, 2017, 3 pages.
Japanese Patent Office Application No. 2014-090907, Office Action dated Nov. 28, 2017, 7 pages.
Japanese Patent Office Application No. 2014-089731, Office Action dated Dec. 20, 2017, 4 pages.
Japanese Patent Office Application No. 2014-089731, Office Action dated Dec. 20, 2017, 7 pages.

\* cited by examiner

SYSTEM AND METHOD FOR A HAPTICALLY-ENABLED DEFORMABLE SURFACE

REFERENCE TO RELATED APPLICATION

This application claims priority to U.S. Provisional Patent Application No. 61/922,536, entitled "System and Method for a Haptically-Enabled Deformable Surface," filed Dec. 31, 2013, and to U.S. Provisional Patent Application No. 61/816,605, entitled "Haptic Augmentation of Continuous Interactions with Bendable Displays," filed Apr. 26, 2013, the entirety of both of which is hereby incorporated by reference herein.

FIELD OF THE INVENTION

The present invention relates to the field of user interface devices. More specifically, the present invention relates to a deformable user interface device with haptic feedback.

BACKGROUND

As computer-based systems become more prevalent, the quality of the interfaces through which humans interact with these systems is becoming increasingly important. One interface that is of growing popularity due to its intuitive and interactive nature is the touchscreen display. Through a touchscreen display, a user can perform a variety of tasks by contacting a region of the touchscreen with the user's finger. In order to create a more intuitive and enhanced user experience, designers often leverage user experience with physical interactions. This is generally done by reproducing some aspects of interactions with the physical world through visual, audio, and/or haptic feedback. Haptic feedback often takes the form of a mechanical vibration or a perceived change in the coefficient of friction. These types of interactions are common and particularly powerful with touchscreen devices. Recently, touchscreen displays have been developed that are flexible. These flexible touchscreen displays can be bent, folded, and/or rolled. Accordingly, there is a need for additional effects for these flexible displays.

SUMMARY

Embodiments of the present disclosure comprise devices comprising haptically-enabled deformable surfaces. In one embodiment, a system of the present disclosure may comprise a first haptic output device configured to receive a first haptic signal and output a first haptic effect to a deformable surface and a second haptic output device configured to receive a second haptic signal and output a second haptic effect to the deformable surface. The system may further comprise a processor coupled to the first haptic output device and the second haptic output device, the processor configured to: determine an event, determine a first haptic effect and a second haptic effect based at least in part on the event, transmit a first haptic signal associated with the first haptic effect to the first haptic output device, and transmit a second haptic signal associated with the second haptic effect to the second haptic output device.

In another embodiment, a method of the present disclosure may comprise: determining an event and determining a first haptic effect based at least in part on the event, determining a second haptic effect based at least in part on the event. The method may also comprise transmitting a first haptic signal associated with the first haptic effect to a first haptic output device, wherein the first haptic output device is configured to receive the first haptic signal and output the first haptic effect to a deformable surface. Further, the method may comprise transmitting a second haptic signal associated with the second haptic effect to a second haptic output device, wherein the second haptic output device is configured to receive the second haptic signal and output the second haptic effect to the deformable surface. Yet another embodiment comprises a computer-readable medium for implementing such a method.

These illustrative embodiments are mentioned not to limit or define the limits of the present subject matter, but to provide examples to aid understanding thereof. Further embodiments are discussed in the Detailed Description, and additional description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1:
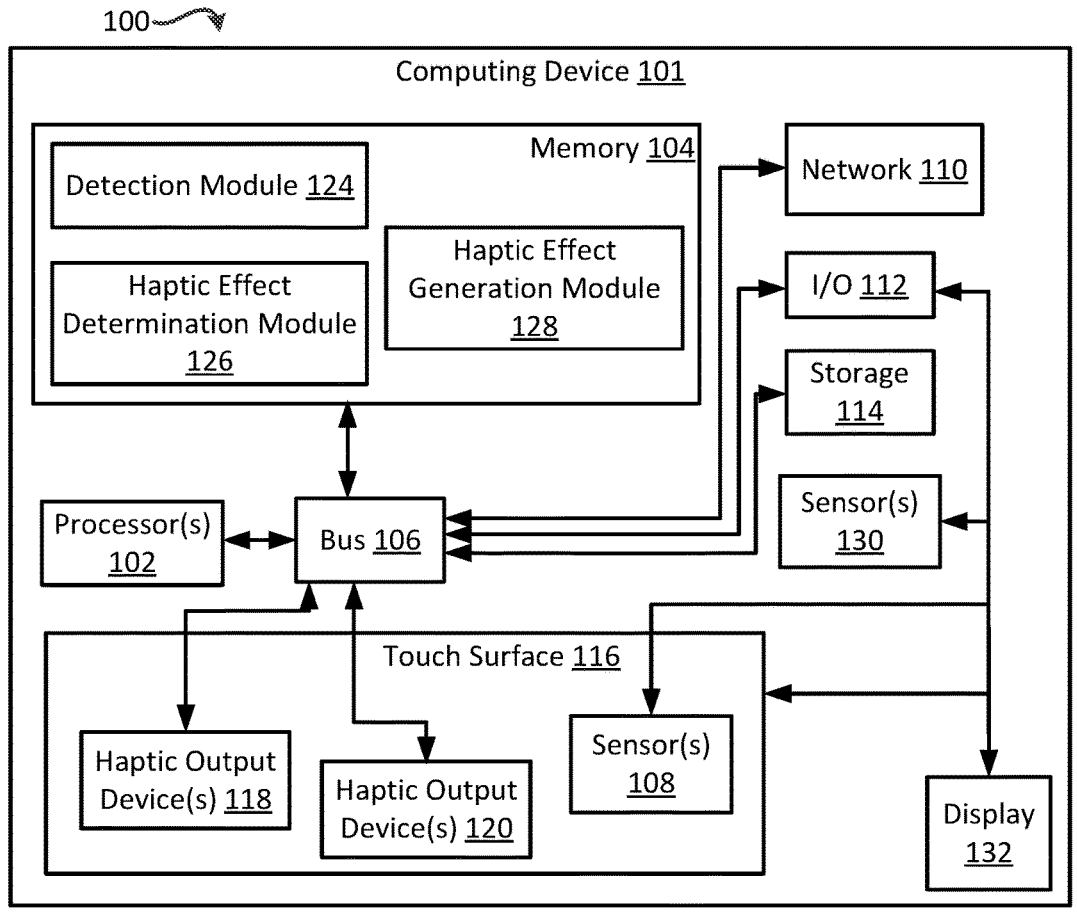
FIG. 1 is a block diagram showing a system for a haptically-enabled deformable surface according to one embodiment.

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Examples of a Haptically-Enabled Deformable Surface

One illustrative embodiment of the present disclosure comprises a computing device configured with a deformable touch-screen display. The computing device may be, for example, a smartphone, tablet, laptop computer, pocket organizer, or portable music player. Further, the computing device and/or the touch-screen display may be flexible, foldable, bendable, twistable, stretchable, and/or rollable, or otherwise deformable.

In the illustrative embodiment, the computing device includes sensors for detecting events, such as user interactions, with the computing device and the touch-screen display, and providing one or more sensor signals associated with the events to a processor in the computing device. These events may comprise interactions, for example, interacting with the touch-screen display by typing on a virtual keyboard or manipulating virtual controls. The processor utilizes the sensor signals associated with these interactions to make determinations associated with software executed by the processor (e.g., applications, operating systems, or other software).

In the illustrative embodiment, the computing device comprises two haptic output devices to provide haptic feedback to a user. In the illustrative embodiment, the first haptic output device is configured to provide an electrostatic friction (ESF) haptic effect. The second haptic output device is configured to deform a surface, for example, the surface of the touch-screen display.

In the illustrative embodiment, based on user interactions with the computing device, the computing device may determine a composite haptic effect. A composite haptic effect comprises multiple haptic effects that may be collectively perceived as a single haptic effect to a user. Based on the composite haptic effect, the computing device generates first and second haptic feedback signals. The computing device transmits the first and second haptic feedback signals to the first and second haptic output devices, respectively. The first and second haptic output devices collectively output the composite haptic effect to the user.

In the illustrative embodiment, the computing device comprises a reading application for reading a book. The reading application is configured to determine and output a haptic effect based on user interaction. For example, in the illustrative embodiment, as a user swipes a finger across the touch-screen display to change the page of the book, the computing device outputs a composite haptic effect. The composite haptic effect may, for example, simulate the feel of turning a page in a book. The composite haptic effect may simulate the feeling of a wave formed in the page of a book when a page is turned.

The composite haptic effect may be generated in any number of ways. For example, in some embodiments, to simulate the feeling of a wave formed in the page of a book, computing device may output a first haptic effect configured to increase the perceived coefficient of friction between the user's finger and the touch-screen display. The computing device may also output a second haptic effect configured to decrease the stiffness of the surface of the touch-screen display.

Upon interacting with the computing device, the user may be able to perceive the composite haptic effect. For example, in the embodiment described above, as the user moves a finger across the touch-screen display, the combination of the increased coefficient of friction and the decreased surface stiffness may cause display surface material to accumulate in front of the user's finger. This accumulation of material may form a wave or bump that moves with the user's finger, simulating the feeling of a page turning in real-world interactions with books.

As will be discussed in further detail below, haptic effects comprising deforming the touch-screen display and/or varying the coefficient of friction can be used in any number of ways to provide information to a user. Additionally, the computing device may output haptic effects (e.g., vibrations) in addition to or instead of deforming the display or varying the coefficient of friction. Similarly, the computing device may output a haptic effect on another surface of the device, e.g., a surface other than the display, such as the surface of the computing device or a touch surface separate from the display.

The description of the illustrative embodiment above is provided merely as an example. Various other embodiments of the present invention are described herein and variations of such embodiments would be understood by one of skill in the art. Advantages offered by various embodiments may be further understood by examining this specification and/or by practicing one or more embodiments of the claimed subject matter.

Illustrative Systems for Enabling Haptic Feedback in a Deformable Surface

FIG. 1 is a block diagram showing a system 100 for a haptically-enabled deformable surface according to one embodiment. In this example, system 100 comprises a computing device 101 having a processor 102 interfaced with other hardware via bus 106. Computing device 101 may comprise, for example, a smartphone, tablet, e-reader, or portable gaming device.

A memory 104, which can comprise any suitable tangible (and non-transitory) computer-readable medium such as RAM, ROM, EEPROM, or the like, may embody program components that configure operation of the computing device 101. In this example, computing device 101 further comprises one or more network interface devices 110, input/output (I/O) interface components 112, and additional storage 114.

Network device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

I/O components 112 may be used to facilitate connection to devices such as one or more displays 132, keyboards, mice, speakers, microphones, buttons, and/or other hardware used to input data or output data. Storage 114 represents nonvolatile storage such as read-only memory, flash memory, ferroelectric RAM (F-RAM), magnetic, optical, or other storage media included in device 101 or coupled to processor 102.

System 100 further includes haptic output devices 118 and 120 in communication with processor 102. The haptic output devices 118 and 120 are configured to output haptic effects that can be sensed by a user. In some embodiments, the haptic output device 118 may output haptic effects comprising, for example, simulating a texture, simulating a vibration, or modulating a perceived coefficient of friction on the touch surface 116 in response to a haptic signal. In some embodiments, haptic output device 118 may comprise an ultrasonic actuator. An ultrasonic actuator may vibrate at an ultrasonic frequency, for example 20 kHz, increasing or reducing the perceived coefficient at the surface of touch surface 116. Further, an ultrasonic actuator may comprise a piezo-electric material. In some embodiments, haptic output device 118 may be a portion of the housing of touch surface 116 and/or computing device 101.

In some embodiments, haptic output device 118 may use electrostatic attraction, for example by use of an electrostatic surface actuator, to output an ESF haptic effect. In some embodiments, the haptic output device 118 may comprise a conducting layer and an insulating layer. The conducting layer may comprise any semiconductor or other conductive material, such as copper, aluminum, gold, or silver. The insulating layer may comprise any insulating material, for example, glass, plastic, or polymer. In some embodiments, the processor 102 may operate the electrostatic actuator by applying an electric signal to the conducting layer. The electric signal may be an AC signal. In some embodiments, a high voltage amplifier may generate the AC signal. Application of the AC voltage to the conducting layer may create a capacitive coupling between the conducting layer and an object (e.g., a user's finger or a stylus) near or touching the touch surface 116. In some embodiments, the capacitive coupling may simulate a friction coefficient, a vibration, or a texture on the surface of the touch surface 116. For example, in one embodiment, the surface of the touch surface 116 may be smooth, but the capacitive coupling may produce an attractive force between an object near or touching the surface of the touch surface 116 (and the conductive layer). In some embodiments, varying the levels of attraction between the object and the conducting layer can vary the haptic effect perceived by the user.

In some embodiments, haptic output device 120 may comprise a deformation device configured to output a deformation haptic effect. In some embodiments, the deformation haptic effect may comprise deforming the surface of the touch surface 116 (e.g., raising or lowering portions of the surface of the touch surface 116). In some embodiments, the deformation haptic effect may comprise bending, folding, rolling, twisting, flexing, changing the shape of, or otherwise deforming the computing device 101 and/or the touch surface 116. That is, the deformation haptic effect may apply a force on the computing device 101 and/or touch surface 116 causing it to bend, fold, roll, twist, flex, change shape, or otherwise deform. In some embodiments, the deformation haptic effect may comprise preventing or resisting computing device 101 and/or touch surface 116 from bending, folding, rolling, twisting, flexing, changing shape, or otherwise deforming.

In some embodiments, haptic output device 120 may comprise fluid, for example, a smart gel. A smart gel may comprise a fluid with mechanical or structural properties that change in response to a stimulus or stimuli (e.g., an electric field, a magnetic field, temperature, ultraviolet light, shaking, or a pH variation). For example, in response to a stimulus, a smart gel may change in stiffness, volume, transparency, and/or color. In some embodiments, stiffness may comprise the resistance of the touch surface 116 against deformation. In some embodiments, one or more wires may be embedded in or coupled to the smart gel. As current runs through the wires, heat is emitted, causing the smart gel to expand or contract, deforming haptic output device 120. Further, in some embodiments, haptic output device 120 may comprise a rheological (e.g., a magneto-rheological or electro-rheological) fluid. A rheological fluid may comprise metal particles (e.g., iron particles) suspended in a fluid (e.g., oil or water). In response to an electric or magnetic field, the order of the molecules in the fluid may realign themselves, which may change the overall damping and/or viscosity of the fluid, deforming haptic output device 120.

In some embodiments, haptic output device 120 may comprise a mechanical deformation device. For example, in some embodiments, haptic output device 120 may comprise an actuator coupled to an arm that rotates a deformation component. The deformation component may comprise, for example, an oval, starburst, or corrugated shape. The deformation component may be configured to move the touch surface 116 at some rotation angles but not others. The actuator may comprise a piezo-electric actuator, rotating/linear actuator, solenoid, an electroactive polymer actuator, macro fiber composite (MFC) actuator, shape memory alloy (SMA) actuator, and/or other actuator. As the actuator rotates the deformation component, the deformation component may move the surface of haptic output device 120, causing it to deform. In such an embodiment, the deformation component may begin in a position wherein the touch surface 116 is flat. In response to receiving a signal from processor 102, the actuator may rotate the deformation component. In some embodiments, rotating the deformation component may cause one or more portions of the touch surface 116 to raise or lower. The deformation may, in some embodiments, remain in this rotated state until the processor 102 signals the actuator to rotate the deformation component back to its original position.

Further, other techniques or methods can be used to deform haptic output device 120. For example, some embodiments may comprise a flexible surface layer configured to deform its surface or vary its texture based upon contact from a surface reconfigurable haptic substrate (including, but not limited to, e.g., fibers, nanotubes, electroactive polymers, piezoelectric elements, or shape memory allows). In some embodiments, haptic output device 120 may be deformed by raising or lowering one or more surface features, for example, with a deforming mechanism, air or fluid pockets, local deformation of materials, resonant mechanical elements, piezoelectric materials, micro-electro-mechanical systems ("MEMS") elements, thermal fluid pockets, MEMS pumps, variable porosity membranes, or laminar flow modulation.

In some embodiments, haptic output device 120 may be a portion of the housing of touch surface 116 and/or computing device 101. In other embodiments, haptic output device 120 may be housed inside a flexible housing overlaying touch surface 116 and/or computing device 101. In some embodiments, the haptic output device 120 may comprise a flexible layer positioned behind computing device 101 and/or touch sensitive surface 116 (e.g., on the back of touch sensitive surface 116). In some embodiments, the haptic output device 120 may be positioned over one or more hinges in a foldable computing device 101. For example, in some embodiments, the haptic output device 120 may comprise a smart gel or rheological fluid and be positioned over a hinge in a foldable display. Upon actuating the haptic output device 120 (e.g., with an electric field or an electric current), the rheological or smart gel may change its characteristics. In some embodiments, changing the characteristics of the rheological fluid or smart gel may cause the computing device 101 and/or a touch sensitive surface 116 to fold, bend, or flex. In other embodiments, changing the characteristics (e.g., hardening or stiffening) of the rheological fluid or smart gel may prevent or resist the computing device 101 and/or touch sensitive surface 116 from folding, bending, or flexing.

In some embodiments, the computing device 101 may comprise additional haptic output devices. For example, the computing device 101 may comprise one or more of a piezoelectric actuator, an electric motor, an electro-magnetic actuator, a voice coil, a shape memory alloy, an electro-active polymer, a solenoid, an ERM, or a linear resonant actuator (LRA). Further, some haptic effects may utilize an actuator coupled to a housing of the computing device 101, and some haptic effects may use multiple actuators of the same or different types in sequence and/or in concert.

For example, in some embodiments, haptic output device 118 may be used in concert with haptic output device 120 to output a composite haptic effect. For instance, in some embodiments, computing device 101 may output a composite haptic effect configured to create a ripple effect on touch surface 116. In one embodiment, haptic output device 118 increases the coefficient of friction on the surface of touch surface 116, while haptic output device 120 decreases the stiffness of the surface of touch surface 116. Combined, as the user moves a finger along the touch surface 116, a ripple may be formed.

As another example, in some embodiments, computing device 101 may output a composite haptic effect configured to cause the user to perceive a rubber button on the surface of touch surface 116. In one embodiment, the haptic output device 118 outputs a haptic effect simulating a rubber texture on the surface of touch surface 116 while haptic output device 120 deforms the surface (e.g., raises portions of the surface) of touch surface 116 to simulate the edges of the button. The combined haptic effects may cause the user to perceive a rubber button on the surface of touch surface 116. In some embodiments, the texture and shape of the rubber button may be modulated via one or more haptic effects. In other embodiments, computing device 101 may output a composite haptic effect configured to cause the user to perceive touch surface 116 as smooth. In one embodiment, haptic output device 118 decreases the coefficient of friction on the surface of touch surface 116 while haptic output device 120 increases the stiffness of the surface of touch surface 116. The combined haptic effects may cause the user to perceive the touch surface 116 as a solid, smooth surface. It should be understood that, although the composite haptic effects described in these examples as comprise two individual haptic effects, a composite haptic effect may comprise any number of individual haptic effects. For example, in some embodiments, the composite haptic effect may comprise a surface deformation, a simulated texture, and a vibration.

Further, system 100 comprises a touch surface 116, which, in this example, is integrated into computing device 101. Touch surface 116 represents any surface configured to sense tactile input of a user (e.g., a touchpad). One or more sensors 108 are configured to detect a touch in a touch area when an object contacts a touch surface 116 and provide appropriate data for use by processor 102. Any suitable number, type, or arrangement of sensors can be used. For example, resistive and/or capacitive sensors may be embedded in touch surface 116. In some embodiments, the sensors 108 may be used to determine the location of a touch, a contact surface area between a user and the touch surface 116, and other information, such as pressure. As another example, optical sensors with a view of the touch surface 116 may be used to determine the touch position.

In other embodiments, the sensor 108 may comprise an LED detector. For example, in one embodiment, touch surface 116 comprises an LED finger detector mounted on the side of a display 132. In some embodiments, the processor 102 is in communication with a single sensor 108, in other embodiments, the processor 102 is in communication with a plurality of sensors 108, for example, a first touch surface and a second touch surface. The sensor 108 is configured to detect user interaction (e.g., gestures, touches, and/or bending, flexing, stretching, folding, twisting, or rolling of the touch surface 116) with one or more touch surfaces 116, and based on the user interaction, transmit signals to processor 102. In some embodiments, sensor 108 may be configured to detect multiple aspects of the user interaction. For example, sensor 108 may detect the speed, direction, and pressure of a user interaction, and incorporate this information into the interface signal.

Figure 2:
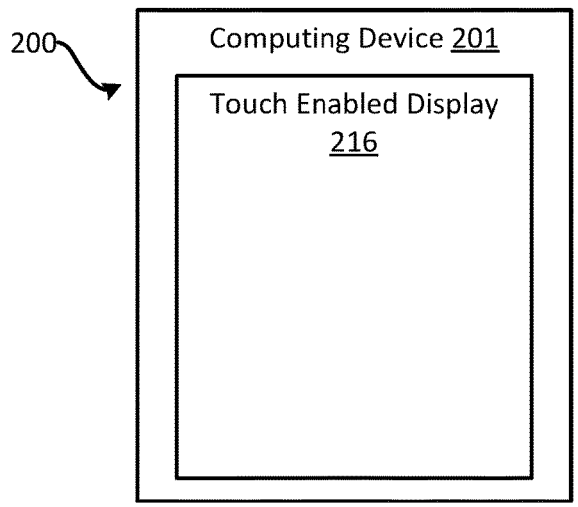
FIG. 2 shows one embodiment of a system for a haptically-enabled deformable surface.

Touch sensitive surface 116 may or may not comprise (or otherwise correspond to) a display 132, depending on the particular configuration of the system 100. Some embodiments may include a touch-enabled display that combines touch sensitive surface 116 and a display 132, as shown in FIG. 2. In some embodiments, a flexible touch sensitive surface 116 may overlay (or otherwise correspond to) a display 132. In such embodiments, the touch surface 116 may correspond to the display 132 exterior or one or more layers of material above the actual display 132 components. Further, in some embodiments, the display 132 may be a "flexible display." A flexible display 132 may be one or more of rollable, bendable, foldable, stretchable, twistable, or otherwise capable of surface deformation based effects. For example, a flexible display 132 may comprise a bendable electronic paper. In some embodiments, the display 132 may be a permanently conformed display. In some embodiments, a permanently conformed display may comprise curved surfaces and flat surfaces. In some embodiments, the curved and/or flat surfaces cannot be deformed.

Returning to FIG. 1, in the embodiment shown, computing device 101 comprises one or more additional sensors 130. The one or more sensors 130 are configured to transmit sensor signals to the processor 102. In some embodiments, sensor 130 may detect environmental characteristics (e.g. the amount of ambient light, humidity, atmospheric pressure, temperature, environmental noises), movement of the computing device 116 (e.g., tilting), and/or deformations (e.g., bending, flexing, stretching, folding, twisting, or rolling) of the computing device 101. In some embodiments, the sensor 130 may comprise a camera, temperature sensor, humidity sensor, sonar device, depth sensor, accelerometer, or gyroscope, capacitive or resistive sensor, pressure sensor, strain gauge, or force sensor. For example, in some embodiments, the sensor 130 may comprise a capacitive sensor for determining a contact surface area between a user and the computing device 101 and/or touch surface 116. Further, in some embodiments, sensor 130 may comprise a biosensor configured to receive biological information and convert the biological information to a corresponding sensor signal based at least in part on the biosensor data. In some embodiments, the biological information may comprise, for example, a person's heart rate, respiration rate, body temperature, or biorhythm. In some embodiments, computing device 101 may determine and output a haptic effect based in part on a signal from sensor 130. Any suitable number, type, or arrangement of sensors 130 can be used. Although the sensor 130 is depicted internal to computing device 101 in FIG. 1, in some embodiments, one or more sensors 130 may be external to computing device 101 (e.g., on another device configured to transmit data from sensor 130 to the computing device 101, or mounted to a user's body, clothing, or elsewhere).

Turning to memory 104, program components 124, 126, and 128 are depicted to show how a device can be configured in some embodiments to provide a haptically-enabled deformable surface. In this example, a detection module 124 configures processor 102 to monitor touch surface 116 via sensor 108 to determine a position of a touch. For example, module 124 may sample sensor 108 in order to track the presence or absence of a touch and, if a touch is present, to track one or more of the location, path, velocity, acceleration, pressure and/or other characteristics of the touch over time. Although the detection module 124 is depicted in FIG. 1 as a program component within the memory 104, in some embodiments, the detection module 124 may comprise hardware configured to monitor touch surface 116 via sensor 108 to detect or determine a position of a touch. In some embodiments, such hardware may comprise analogue to digital converters, processors, microcontrollers, comparators, amplifiers, transistors, and other analogue or digital circuitry.

Haptic effect determination module 126 represents a program component that analyzes data regarding touch characteristics to determine a haptic effect to generate. Particularly, haptic effect determination module 126 may comprise code that determines, based on an interaction with touch sensitive surface 116, a haptic effect to output and code that selects one or more haptic effects to provide in order to output the effect. For example, in some embodiments, some or all of the area of touch surface 116 may be mapped to a graphical user interface. Haptic effect determination module 126 may select different haptic effects based on the location of a touch in order to simulate the presence of a feature on the surface of touch surface 116. In some embodiments, these features may correspond to a visible representation of the feature on the interface. However, haptic effects may be provided via touch surface 116 or the display 132 even if a corresponding element is not displayed in the interface (e.g., a haptic effect may be provided if a boundary in the interface is crossed, even if the boundary is not displayed).

Further, in some embodiments, haptic effect determination module 126 may comprise code that determines, based on the degree of flexing, bending, folding, twisting, or stretching in the touch surface 116 or the display, a haptic effect to output to the surface of the touch surface 116. Haptic effect determination module 126 may further comprise code that selects one or more haptic effects to provide in order to simulate the effect. For example, haptic effect determination module 126 may select haptic effects based on the amount of flex in the touch surface 116 or the display. For example, in one embodiment, as the user flexes the computing device more than 20 degrees, the module 126 outputs a haptic effect configured to deform the touch surface 116. In some embodiments, this touch surface 116 deformation may provide confirmation to the user that the touch surface 116 is flexed more than 20 degrees.

In some embodiments, haptic effect determination module 126 may comprise code that determines a haptic effect to output based on an amount of a user's finger in contact with the touch surface 116 (e.g., the surface area of contact between the finger and the touch surface 116). For example, in some embodiments, haptic effect determination module 126 may select different haptic effects based on the amount of a user's finger in contact with the surface of touch surface 116. In one embodiment, as the user flexes the computing device, a smaller area of the user's skin may make contact with the surface of touch surface 116. Reduced contact area between a user's finger and the touch surface 116 may result in the user perceiving a less intense haptic effect. For example, reduced contact area may cause the user to perceive only a percentage of a haptic effect, e.g., a haptic effect intended to increase the perceived coefficient of friction. The haptic effect determination module 126 may detect or determine this reduction in surface contact and, in response, output a haptic effect to compensate for this change. For example, the haptic effect determination module may determine a more intense haptic effect to compensate for the reduced contact area. Thus, the coefficient of friction perceived by the user remains the same as before the flexing of the computing device 101.

In some embodiments, haptic effect determination module 126 may comprise code that determines different haptic effects to be output at different locations on the touch surface 116. In some embodiments, the different haptic effects 116 may be configured to provide a more consistent haptic experience to a user. For example, in some embodiments, a user may contact the touch surface 116 with two or more fingers. In such embodiments, deformations in the touch surface 116 and/or computing device 101, different contact surface areas between the user's fingers and the touch surface 116, and/or other factors may cause the user to perceive inconsistent haptic effects between the two or more touch locations. For example, the user may perceive the haptic effect output at one touch surface 116 location as stronger than the haptic effect output at a second touch surface 116 location. In some embodiments, the haptic effect determination module 126 may determine one or more haptic effects configured to cause the user to perceive a consistent experience between the multiple touch surface 116 locations. For example, the haptic effect determination module 126 may determine a first haptic effect with a decreased magnitude at the first touch location and a second haptic effect with an increased magnitude at the second touch location.

In some embodiments, haptic effect determination module 126 may comprise code that determines a haptic effect to output based on the amount of pressure a user (e.g., the user's finger) exerts against the touch surface 116 and/or computing device 101. For example, in some embodiments, haptic effect determination module 126 may select different haptic effects based on the amount of pressure a user exerts against the surface of touch surface 116. In some embodiments, the amount of pressure a user exerts on the touch surface 116 may affect the strength of the haptic effect perceived by the user. For example, in some embodiments, reduced pressure may cause the user to perceive a weaker haptic effect. The haptic effect determination module 126 may detect or determine this reduction in pressure and, in response, output or change a haptic effect to compensate for this change. For example, the haptic effect determination module may determine a more intense haptic effect to compensate for the reduced pressure. Thus, the haptic effect perceived by the user remains the same as before the reduction in pressure.

In other embodiments, haptic effect determination module 126 may comprise code that determines, based on signals from sensor 130 (e.g., a humidity, temperature, an amount of ambient light, an accelerometer measurement, or a gyroscope measurement), a haptic effect to output to touch surface 116. For example, in some embodiments, haptic effect determination module 126 may determine a haptic effect based on the amount of ambient light. In such embodiments, as the ambient light decreases, the haptic effect determination module 126 may determine a haptic effect configured to deform the touch surface 116 or vary the perceived coefficient of friction on touch surface 116. In some embodiments, haptic effect determination module 126 may determine haptic effects based on the temperature (e.g., as the temperature decreases, the haptic effect determination module 126 may determine a haptic effect wherein the user perceives a decreasing coefficient of friction at the surface of touch surface 116).

In some embodiments, environmental conditions (e.g., humidity, temperature, pressure, environmental vibrations/noise, or an amount of ambient light) may impact physical properties of the touch surface 116 (e.g., its elasticity or shape). Changes in the physical properties of the touch surface 116 may impact the haptic effect perceived by the user. Haptic effect determination module 126 may determine haptic effects configured to counteract these changes in physical properties. In some embodiments, this may provide a more consistent haptic experience for the user. For example, in some embodiments, as temperature decreases, the elasticity of the touch surface 116 may decrease, resulting in the touch surface 116 becoming more rigid. In response, haptic effect determination module 126 may determine a haptic effect configured to increase the elasticity of the surface of the touch surface 116. In some embodiments, the increased elasticity may provide a more consistent haptic experience for the user. As another example, in some embodiments, as environmental humidity or vibrations increase, the surface of touch surface 116 may deform. In response, haptic effect determination module 126 may determine a haptic effect configured to resist deformations of the touch surface 116. Further, in some embodiments, haptic effect determination module 126 may determine a haptic effect configured to fold, bend, flex, or otherwise deform the touch surface 116 substantially back to its unadulterated configuration.

In some embodiments, haptic effect determination module 126 may comprise code that determines a haptic effect to be output by haptic output device 118 based on a haptic effect to be output by haptic output device 120. Likewise, in some embodiments, haptic effect determination module 126 may comprise code that determines a haptic effect to be output by haptic output device 120 based on a haptic effect to be output by haptic output device 118. For example, in some embodiments, the haptic effect determination module 126 may determine a first haptic effect comprising a decrease in a perceived coefficient of friction to be output by haptic output device 118. In some embodiments, based on the first haptic effect, the haptic effect determination module 126 may determine a second haptic effect comprising an increase in surface tension of the touch surface 116. The combination of the decrease in the perceived coefficient of friction and the increased surface tension may make a user interaction (e.g., a sliding gesture) more easily input by the user.

Although the haptic effect determination module 126 is depicted in FIG. 1 as a program component within the memory 104, in some embodiments, the haptic effect determination module 126 may comprise hardware configured to determine one or more haptic effects to generate. In some embodiments, such hardware may comprise analogue to digital converters, processors, microcontrollers, comparators, amplifiers, transistors, and other analogue or digital circuitry.

Haptic effect generation module 128 represents programming that causes processor 102 to generate and transmit haptic signals to haptic output devices 118 and 120 to generate the selected haptic effect. For example, the haptic effect generation module 128 may access stored waveforms or commands to send to haptic output devices 118 and 120 to create the desired effect. In some embodiments, haptic effect generation module 128 may comprise algorithms to determine the haptic signal. Further, in some embodiments, haptic effect generation module 128 may comprise algorithms to determine target coordinates for the haptic effect (e.g., coordinates for a location on the touch surface 116 or the display).

Although the haptic effect generation module 128 is depicted in FIG. 1 as a program component within the memory 104, in some embodiments, the haptic effect generation module 128 may comprise hardware configured to determine one or more haptic effects to generate. In some embodiments, such hardware may comprise analogue to digital converters, processors, microcontrollers, comparators, amplifiers, transistors, and other analogue or digital circuitry.

Figure 3:
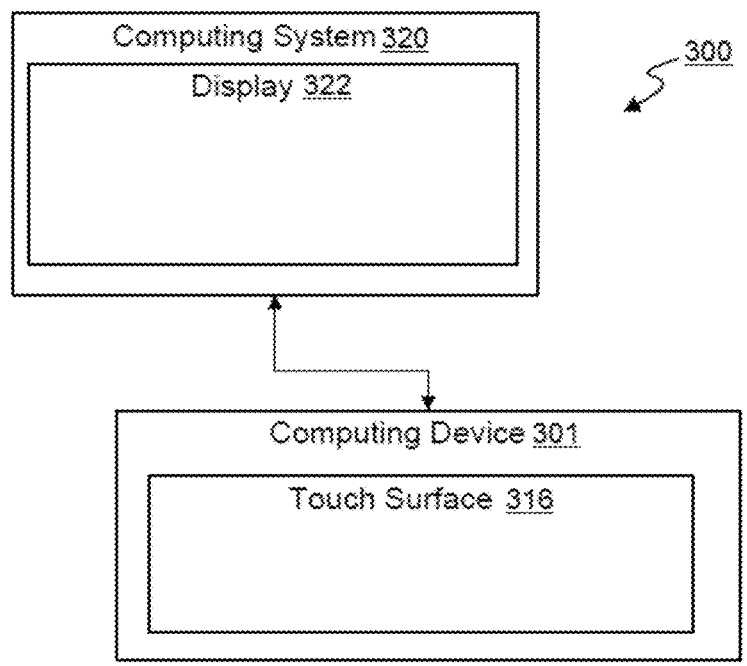
FIG. 3 shows another embodiment of a system for a haptically-enabled deformable surface.

FIG. 3 shows another embodiment of a system for a haptically-enabled deformable surface. In this example, the touch surface 316 does not overlay a display 322. Computing device 301 comprises a touch surface 316, which may be mapped to a graphical user interface provided in a display 322 included in computing system 320. Computing system 320 is communicatively coupled to computing device 301. Computing device 301 may comprise a mouse, trackpad, or other device, while computing system 320 may comprise a laptop computer, set-top box (e.g., DVD player, DVR, cable television box), or another computing system.

In some embodiments, the touch surface 316 and display 322 may be disposed in the same device, such as a touch enabled track pad in a laptop computer comprising display 322. Whether integrated with a display or otherwise, the depiction of planar touch surfaces in the examples herein is not meant to be limiting. Other embodiments may comprise curved or irregular touch enabled surfaces that are further configured to provide haptic effects.

Figure 4A:
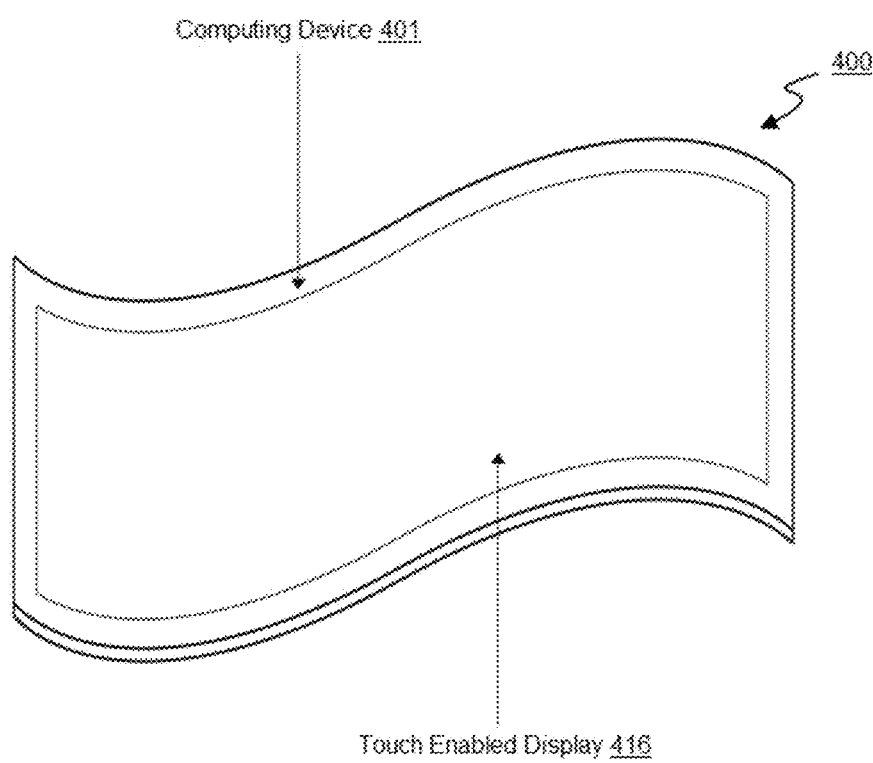
FIG. 4A shows another embodiment of a system for a haptically-enabled deformable surface.

FIG. 4A shows another embodiment of a system for a haptically-enabled deformable surface. Deformable computing device 401 comprises a deformable touch-enabled display 416, which combines a touch surface and a display. The computing device 401 and/or touch-enabled display 416 may be flexible, bendable, foldable, twistable, stretchable, or rollable. In some embodiments, computing device 401 may comprise a multifunction controller, for example, a controller for use in a kiosk, automobile, alarm system, thermostat, or other type of computing device. In some embodiment, computing device 401 may comprise a smartphone, tablet, or other type of computer.

Computing system 400 further comprises one or more haptic output devices. At least one haptic output device is configured to output an ESF haptic effect, for example, a haptic effect simulating a texture or a vibration, or varying a perceived coefficient of friction at the surface of touch enabled display 416. Further, in some embodiments, the computing device 400 may comprise a haptic output device configured to output a deformation haptic effect.

In some embodiments, the computing device 401 may output a haptic effect in response to an event. An event, as used herein, is any interaction, action, collision, or other event which occurs during the operation of the computing device 401 which can potentially comprise an associated haptic effect. In some embodiments, an event may comprise user input (e.g., interaction with a real or virtual button; manipulating a joystick; interacting with a touch surface; tilting or orienting the computing device 401; or bending, folding, twisting, stretching, or flexing the computing device 101), a system status (e.g., low battery, low memory, or a system notification, such as a notification generated based on the system receiving an incoming call), sending data, receiving data, or a program event (e.g., if the program is a game, a program event may comprise explosions, collisions or interactions between game objects, or advancing to a new level).

Figure 4B:
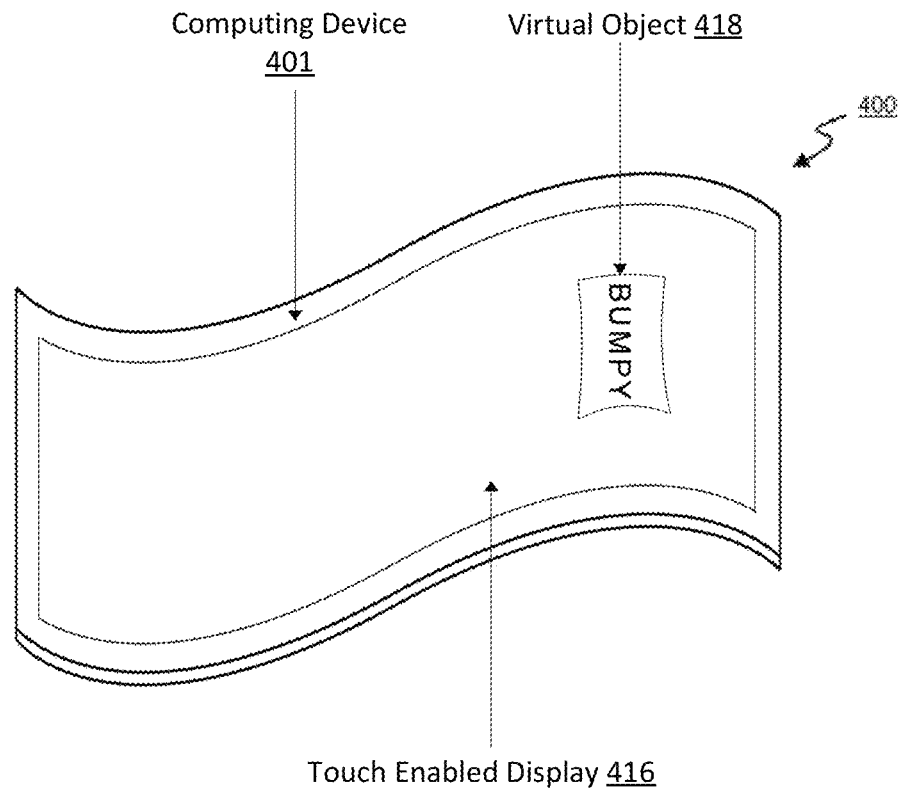
FIG. 4B shows yet another embodiment of a system for a haptically-enabled deformable surface.

For example, in some embodiments, the computing device 401 may output one or more virtual objects (e.g., a virtual menu, list, slider, knob, button, or other interface), as shown in FIG. 4B. In the embodiment shown in FIG. 4B, the virtual object 418 comprises a button with the word "BUMPY". Upon a user interacting with the one or more virtual objects 418 via touch enabled display 416, one or more haptic output devices may output haptic effects (e.g., a simulated bumpy texture). In some embodiments, the computing device may output one or more haptic effects configured to cause a user to perceive a bump, border, or other obstacle corresponding to an edge of a virtual object 418. In some embodiments, a virtual object 418 may comprise a widget configured to control a system associated with the widget. For example, in some embodiments, the widget may comprise a virtual knob configured to control a temperature setting of a climate control system. Thus, by interacting with the virtual knob, a user may be able to adjust temperature settings.

In some embodiments, multiple haptic output devices may output haptic effects in sequence or in concert. In some embodiments, the computing device 401 may determine the multiple haptic effects such that a user perceives the multiple haptic effects as a single composite effect. Composite haptic effects are discussed in further detail with respect to FIG. 8.

Figure 4C:
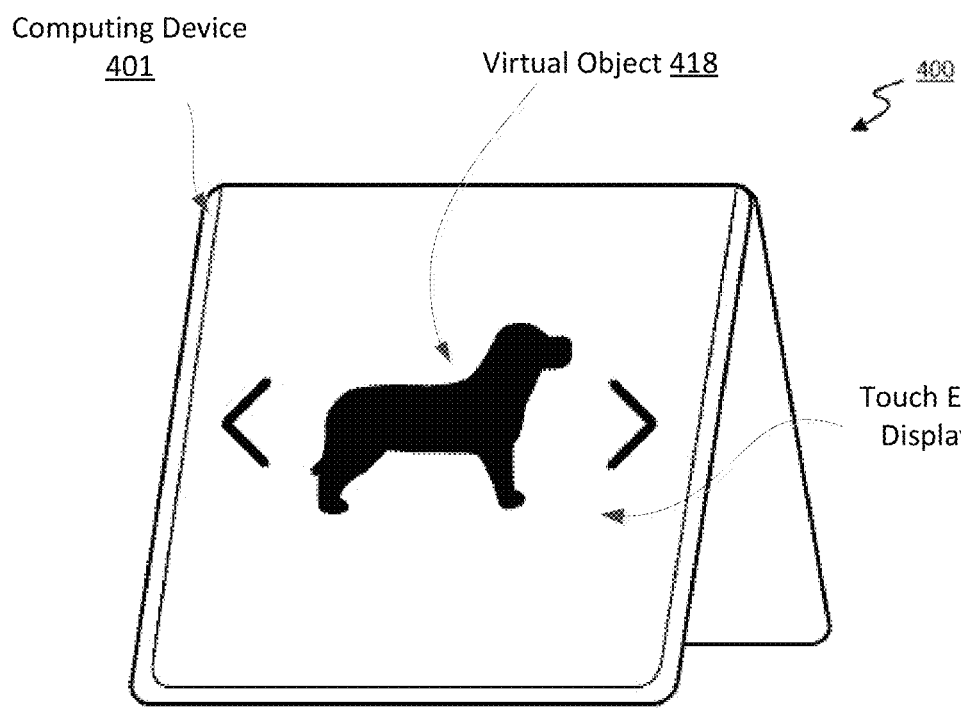
FIG. 4C shows still another embodiment of a system for a haptically-enabled deformable surface.

FIG. 4C shows still another embodiment of a system for a haptically-enabled deformable surface. Deformable computing device 401 comprises a deformable touch-enabled display 416, which combines a touch surface and a display. In this example, the computing device 401 is executing an application, for example, a photo album application. The application is outputting virtual objects 418 (e.g., a photo of a dog) via the touch enabled display 416.

In some embodiments, the computing device 401 may output one or more haptic effects configured to flex, bend, fold, twist, stretch, or roll the computing device 401 and/or touch sensitive surface 416 based on an event. For example, in the example shown in FIG. 4C, the computing device 401 has output a haptic effect configured to cause the computing device 401 to fold in half, so that the back half of the computing device 401 acts as a stand for the computing device 401, raising the computing device 401 off a resting surface. In some embodiments, such a configuration may allow a user to more easily interact with or perceive application data (e.g., photos).

Further, in some embodiments, the computing device 401 and/or touch enabled display 416 may output haptic effects configured to change the shape of the computing device 401 and/or touch enabled display 416. In some embodiments, the computing device 401 and/or touch enabled display 416 may change shape in response to the occurrence of an event, for example, the execution of a photo album application. For example, in some embodiments, upon the execution of a photo album application, the computing device 401 may output a haptic effect configured to change the shape of the computing device 401 to a photo frame. In some embodiments, changing the shape of the computing device 401 and/or touch enabled display 416 may provide a more realistic user interface experience for the user. In some embodiments, the computing device 401 and/or touch enabled display 416 may change shape to enable or facilitate user input. For example, in some embodiments, the computing device 401 may output a haptic effect configured to change the shape of the touch enabled display 416 (e.g., to a game controller) to enable a user to provide input more easily (e.g., for a gaming application). In some embodiments, the computing device 401 and/or touch enabled display 416 may change shape based on information to be displayed to a user (e.g., the content of the information), or to display information (e.g., the computing device 401 may display information to a user through its shape). For example, in some embodiments, the computing device 401 may output a haptic effect configured to change the shape of the touch enabled display 416 in order to optimize the information to be displayed on the touch enabled display 416.

In some embodiments, the user may be able to flex, bend, fold, stretch, or twist the computing device 416 into a configuration. In some embodiments, the computing device 416 may output one or more haptic effects configured to maintain that configuration. For example, in some embodiments, the user may deform the computing device 401 and/or touch enabled display 416 to make the computing device 401 and/or touch enabled display 416 conform to the shape of the user's body (e.g., the user may bend the computing device 401 around the user's wrist). In some embodiments, the computing device 401 may output one or more haptic effects in response to the user flexing, bending, or folding the device, or other event. For example, in some embodiments, the computing device 401 may output one or more haptic effects configured to maintain or hold the flex or bend (e.g., by preventing further flexing or deformation) in the computing device 401 and/or touch enabled display 416. In some embodiments, maintaining the flex or bend in the computing device 401 and/or touch enabled display 416 may allow a user to conform the computing device 401 to a shape (e.g., around the user's ankle) for use as a wearable device (e.g., as a ring, watch, bracelet, anklet, headband, or sleeve).

Figure 5:
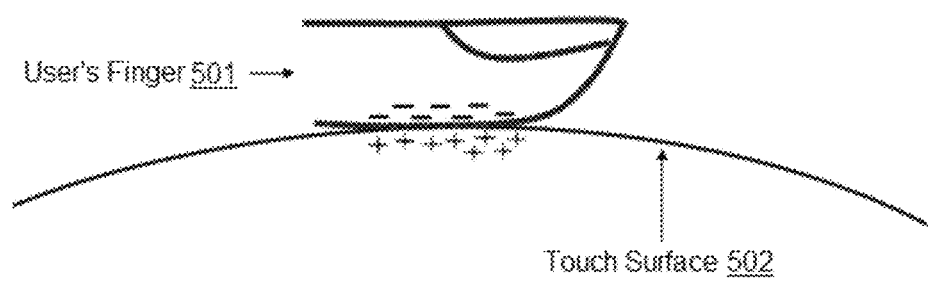
FIG. 5 shows one embodiment of a user interaction with a haptically-enabled deformable surface.

FIG. 5 shows one embodiment of a user interaction with a haptically-enabled deformable surface 502. In some embodiments, a user may flex or bend touch surface 502. For example, the user may flex touch surface 502 to lay the computing device over an uneven surface. As another example, a user may flex touch surface 502 to input data, such as when flexing computing device comprises part of a game. In some embodiments, a haptic output device may cause the flexing or bending in the touch surface 502 as part of a haptic effect.

In this example, the touch surface 502 is flexed so that a large portion of the user's finger 501 is in contact with the touch surface 502. In some embodiments, the computing device may output a haptic effect in response to flexing, bending, twisting, stretching, or folding of the computing device and/or the touch surface 502. In some embodiments, the haptic effect may comprise ESF effects, vibrations, and/or deformations.

For example, in some embodiments, the computing device may detect bending, folding, or flexing. In response, in some embodiments, the computing device may output haptic effects configured to provide a more consistent haptic experience for the user. For instance, in some embodiments, the amount of surface area of skin in contact with the touch surface 502 may vary the user's perception of an ESF haptic effect. As more surface area of the user's finger 501 makes contact with the touch surface 502, the user may feel a stronger haptic effect. Conversely, as less surface area of the user's finger 501 makes contact with the touch surface 502, the user may feel a weaker effect. Thus, in some embodiments, upon detecting the flexing, the computing device may determine that a relatively large amount of the user's finger 501 is in contact with touch surface 502. In response, the computing device may output a haptic effect configured to decrease the capacitive coupling between the user and the touch surface 502. In some embodiments, this may result in the user perceiving a more constant ESF haptic effect.

Figure 6:
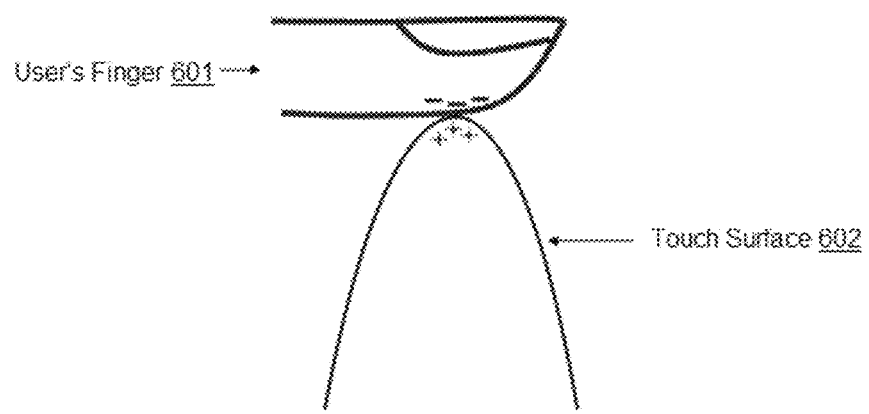
FIG. 6 shows another embodiment of a user interaction with a haptically-enabled deformable surface.

FIG. 6 shows another embodiment of a user interaction with a haptically-enabled deformable surface 602. In this example, the computing device is outputting an ESF haptic effect. Further, in this example, the touch surface 602 is flexed such that less surface area of user's finger 601 is in contact with touch surface 602 than in the example shown in FIG. 5. In some embodiments, the computing device may output a haptic effect in response to flexing, bending, twisting, stretching, or folding of the computing device and/or the touch surface 502. In some embodiments, the haptic effect may comprise ESF effects, vibrations, and/or deformations.

For example, in some embodiments, the computing device may detect bending, folding, or flexing. In response, in some embodiments, the computing device may output haptic effects configured to provide a more consistent haptic experience for the user. For instance, as noted above, as less surface area of the user's finger 601 makes contact with the touch surface 602, the user may feel a weaker ESF haptic effect, even if the ESF haptic effect is output at a constant strength. Thus, in some embodiments, upon detecting the flexing, the computing device may determine that a relatively small amount of the user's finger 601 is in contact with touch surface 602. In response, the computing device may output a haptic effect configured to increase the capacitive coupling between the user and the touch surface 602. In some embodiments, this may result in the user perceiving a more constant ESF haptic effect.

In some embodiments, user input may comprise folding, twisting, bending, stretching, or otherwise deforming the computing device and/or the touch surface 602. For example, the computing device may comprise an application (e.g., a contact list application) in which user input comprises folding the computing device (e.g., folding a corner of the computing device to scroll downwards through the contact list). In some embodiments, upon the user folding the computing device, the computing device may output one or more haptic effects. For example, in some embodiments, the haptic effect may comprise a deformation configured to resist against the user bending or flexing the computing device and/or touch surface 602 (e.g., if the user has reached the end of the contact list). In some embodiments, the haptic effect may comprise a deformation configured to assist the user in folding the computing device (e.g., if the user is at the beginning of the contact list). In other embodiments, the haptic effect may comprise a mechanical detent or vibration. In some embodiments, the detent or vibration may notify the user of information (e.g., that the user has just scrolled passed a favorite contact, that the user is scrolling through a new subset of contacts, that the computing device has received the user's input, or that the user interaction is complete).

In some embodiments, the computing device may output haptic effects determined based on the manipulation of the computing device (e.g., the amount of flexing, bending, twisting, stretching, or folding in the computing device). For example, if the user folds the computing device within a first range, such as between 10 and 20 degrees, the computing device may output a first haptic effect (e.g., a deformation configured to assist the user in folding the computing device further). If the user bends the computing device within a second range, such as between 20 and 30 degrees, the computing device may output a second haptic effect (e.g., modulate the perceived coefficient of friction on the surface of touch surface 602 proportionally to the amount of bend in the computing device). Further, in some embodiments, a haptic effect may be associated with the transition between the first range and the second range. That is, upon the user bending the computing device roughly 20 degrees, the computing device may output a haptic effect (e.g., a vibration). In some embodiments, the transition haptic effect may notify the user that the bend has transitioned between the two ranges.

Figure 7:
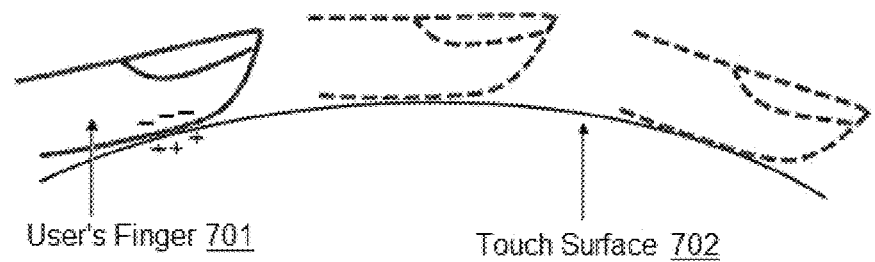
FIG. 7 shows a user interaction with a haptically-enabled deformable surface according to one embodiment.

FIG. 7 shows a user interaction with a haptically-enabled deformable surface according to one embodiment. In some embodiments, the touch surface 702 comprises the surface of a computing device, such as a smartphone, laptop, tablet, e-reader, or other electronic device. In some embodiments, a user may flex or bend touch surface 702. For example, in some embodiments, the user may bend or fold the touch surface 702 to input data to a program (e.g., to turn the page of a virtual book, to zoom in or out on a picture, or to scroll through a webpage). In some embodiments, the computing device may output a haptic effect configured to flex, bend, or deform the surface of touch surface 702. In some embodiments this haptic effect may oppose or assist user interaction with the touch surface (e.g., folding or bending touch surface 702).

In some embodiments, the computing device may output one or more haptic effects based on user interaction. In some embodiments, the user interaction may comprise past, current, or anticipated future interaction. For example, in some embodiments, the user may execute a drawing program through which the user may draw a picture by sliding a finger across the surface of touch surface 702. In response, the computing device may output a composite haptic effect configured to simulate, for example, glass. In some embodiments, the composite haptic effect may comprise a first haptic effect configured to decrease the coefficient of friction perceived by the user. Further, the composite haptic effect may comprise a second haptic effect configured to increase the stiffness of the touch surface 702. In some embodiments, the composite haptic effect may create a smooth, rigid surface (e.g., a glass-like surface) over which a user's finger may more easily slide.

As another example, in some embodiments, a user may execute a text entry program, through which the user enters text by interacting with a virtual keyboard output on the touch surface 702. In some embodiments, the computing device may output a haptic effect configured to simulate a texture (e.g., plastic) over the keys of the virtual keyboard. In some embodiments, the haptic effect may make text entry more intuitive for a user. Further, in some embodiments, the computing device may output a composite haptic effect. In some embodiments, the composite haptic effect may be configured to simulate a keyboard. In some embodiments, the composite haptic effect may comprise a first haptic effect configured to stiffen the touch surface 702. In some embodiments, stiffening of the touch surface 702 may make text entry easier for a user. The computing device may further output a second haptic effect configured to deform the touch surface 702 into a substantially planar shape. In some embodiments, deforming the touch surface 702 to a substantially planar shape may make text entry easier for a user. Further, the computing device may output a third haptic effect configured to simulate a texture (e.g., rubber) over the keys of the virtual keyboard. In some embodiments, the composite haptic effect may make text entry easier for a user.

Figure 8:
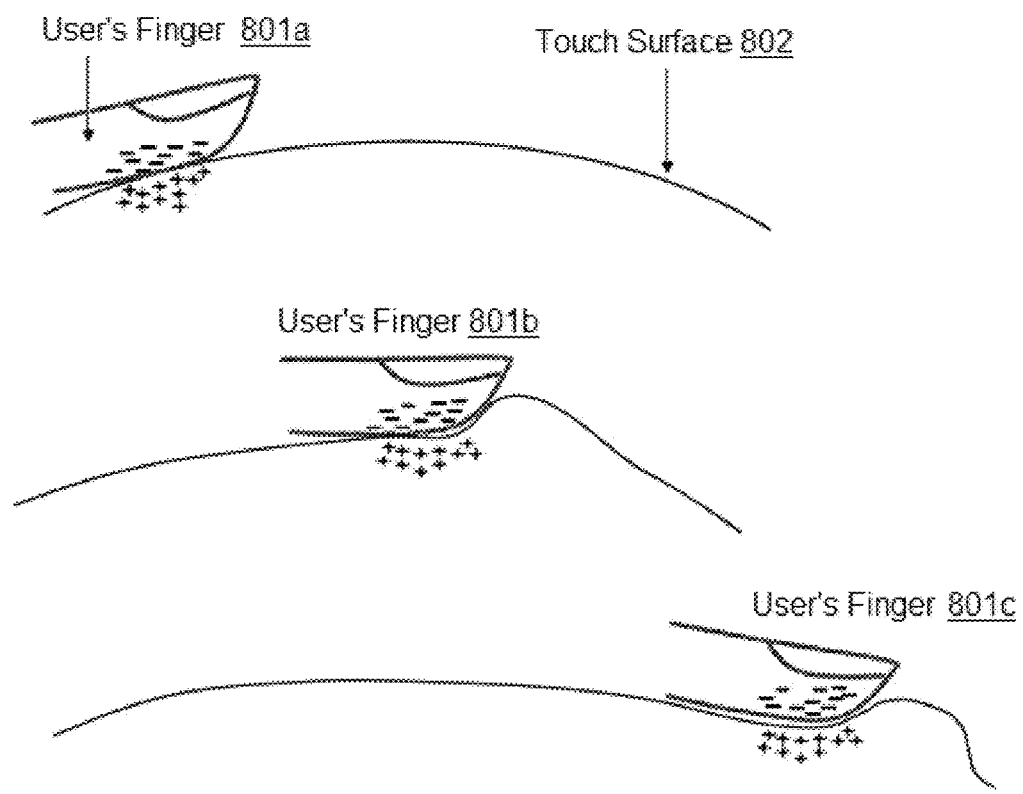
FIG. 8 shows another embodiment of a user interaction with a haptically-enabled deformable surface.

FIG. 8 shows another embodiment of a user interaction with a haptically-enabled deformable surface. In the embodiment shown in FIG. 8, multiple haptic output devices output haptic effects (e.g., an increase in a coefficient of friction perceived by a user and a decrease in the elasticity of the touch surface 802). These haptic effects are configured to generate a composite haptic effect. In the embodiment shown in FIG. 8, this composite haptic effect comprises a bump or ripple in the touch surface 802. As a result, as shown in FIG. 8, as the user moves a finger 801a-c across touch surface 802 a ripple or bump may form. This ripple or bump may, in some embodiments, comprise the accumulated material of the touch surface 802 forming in front of the user's finger. In some embodiments, such a composite effect may be used to simulate various features on touch surface 802.

In some embodiments, the computing device may comprise an e-reader with a deformable touch surface 802. In some embodiments, the user may be reading a book on the e-reader via a reading application. The e-reader may output a haptic effect associated with the reading application. For example, a user may swipe a finger 801a-c from the left side of the touch surface 802 to the right side of the touch surface 802 to change the page of the book. In response, in some embodiments, the computing device may output one or more haptic effects. In some embodiments, the haptic effect may comprise a composite haptic effect configured to simulate the feeling of a wave formed in the page of a book as the page is turned. For example, one haptic output device may output an ESF haptic effect configured to increase the perceived coefficient of friction between the user's finger 801a-c and the touch surface 802. Another haptic output device may output a haptic effect configured to decrease the stiffness of the surface of the touch surface 802. As the user moves a finger 801a-c from the left side of the touch surface 802 to the right side of the touch surface 802, the ESF haptic effect may cause the user to feel additional friction. The additional friction may cause material from deformable touch surface 802 to accumulate in front of the user's moving finger 801a-c, forming a wave or bump in the touch surface 802. This wave or bump may simulate the feeling of a page turning, e.g., a page in a paperback book.

In some embodiments, as the user interacts with the computing device (e.g., pushes the ripple or bump along with a finger 801a-c), the computing device may vary the characteristics of the composite haptic effect. In some embodiments, the computing device may vary the characteristics of the composite haptic effect by modulating the characteristics of one or more individual haptic effects that, when combined, make up the composite haptic effect. For example, as the user pushes the ripple or bump along with a finger 801a-c, the computing device may modulate the elasticity of the touch surface 802. In some embodiments, by varying the characteristics of the composite haptic effect, the user may perceive a new or different composite haptic effect.

In other embodiments, the computing device may deform the touch surface 802 and output an ESF haptic effect to provide the user with confirmation that a gesture is available. For example, in some embodiments, as the user moves a finger 801a-c across the surface of the touch surface 802, the user may pass over a button, slider, or other input device on the surface of the touch surface 802. As the user's finger 801a-c passes over this input device, the computing device may output one or more haptic effects to let the user know that a finger 801a-c has passed over an input location. For example, in one embodiment, as the user's finger 801a-c moves over top of a virtual button, the computing device outputs a composite haptic effect configured to increase the coefficient of friction and deform the touch surface 802 to create a texture. In some embodiments, the composite haptic effect may alert the user to the presence of the button. In another embodiment, as the user's finger 801a-c moves over top of a slider, the computing device may output a composite haptic effect configured to increase the coefficient of friction and decrease the stiffness of the surface of the touch surface 802. In some embodiments, the composite haptic effect may alert the user to the presence of the slider.

Illustrative Methods for Enabling Haptic Feedback in a Deformable Surface

Figure 9:
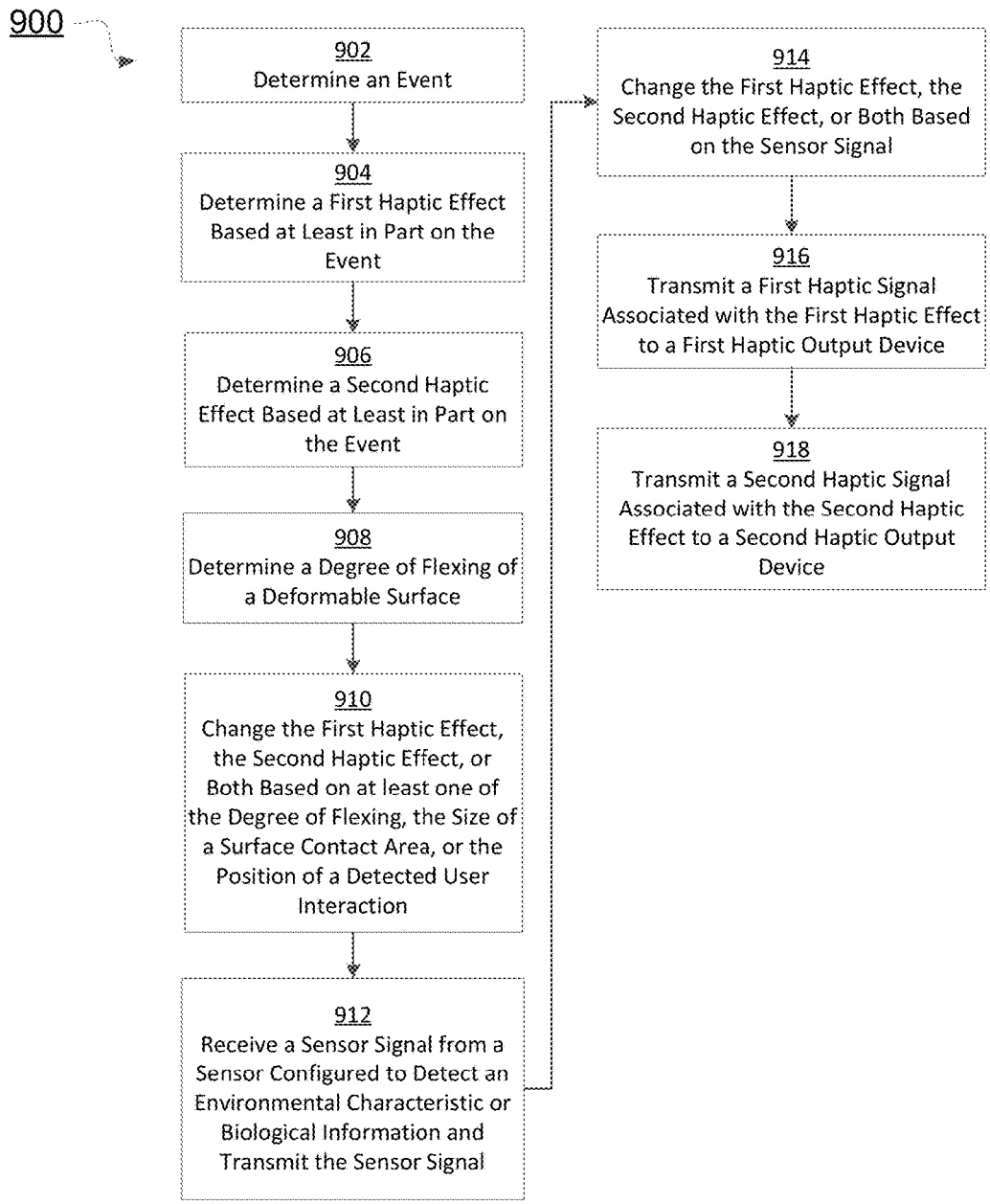
FIG. 9 is a flowchart showing a method for haptic feedback on a deformable surface according to one embodiment.

FIG. 9 is a flowchart showing a method for haptic feedback on a deformable surface according to one embodiment. In some embodiments, the steps in FIG. 9 may be implemented in program code that is executed by a processor, for example, the processor in a general purpose computer, a mobile device, or a server. In some embodiments, these steps may be implemented by a group of processors. In some embodiments one or more steps shown in FIG. 9 may be omitted or performed in a different order. Similarly, in some embodiments, additional steps not shown in FIG. 9 may also be performed. The steps below are described with reference to components described above with regard to system 100 shown in FIG. 1.

The method 900 begins at step 902 when processor 102 determines an event. In some embodiments, an event may comprise, for example, interacting with the touch surface 116 or the computing device 101, or a program event (e.g., the execution of software). For example, in some embodiments, a user may fold the corner of the computing device 101 to provide input. In response, the processor 102 may determine that an event has occurred.

The method 900 continues when processor 102 determines a first haptic effect based at least in part on the event 904. In some embodiments, the first haptic effect may comprise an effect configured to be output by haptic output device 118. Haptic output device 118 may comprise one or more electrostatic actuators configured to simulate textures or vibrations, or vary the perceived coefficient of friction on touch surface 116 using electrostatic fields. The processor 102 may rely on programming contained in haptic effect determination module 126 to determine the first haptic effect to output to first haptic output device 118. For example, in some embodiments, haptic effect determination module 126 may comprise a lookup table. In one such embodiment, specific user inputs may be associated with particular haptic effects. For example, in one embodiment, in response to typing the word "friction" on a virtual keyboard on the device, the haptic effect determination module 126 associates a haptic effect wherein the haptic output device 116 increases the coefficient of friction at the touch surface 116.

In some embodiments, the lookup table may comprise data associated with features of a user interface and a plurality of available haptic effects. For example, some embodiments, the lookup table may comprise data associated with user interactions with a user interface, such as sliding a user's finger over a virtual button, and a plurality of available haptic effects. For example, in such an embodiment, in response to a user sliding a finger over a virtual button, the processor 102 may consult the lookup table. Based on the lookup table, the processor 102 may determine a first haptic effect to be output by the first haptic output device 118 wherein the coefficient of friction at touch surface 116 is increased. In some embodiments, the plurality of available haptic effects may comprise a plurality of textures. For example, the plurality of textures may comprise one or more of the textures of: sand, glass, ice, rubber, water, or any other available texture. For example, in some embodiments, a specific texture may be associated with a button, for example, a glass texture. In such an embodiment, the processor 102 may consult the lookup table and determine a haptic effect in which the perceived coefficient of friction on the surface of touch surface 116 is decreased to create the feel of a glass button.

In some embodiments, a first haptic effect may be associated with the virtual terrain that a character in the game is passing over. For example, in one embodiment, a first haptic effect is associated with sand over which the character in the video game is walking. In such an embodiment, the processor 102 may determine a first haptic effect wherein the perceived coefficient of friction on the surface of touch surface 116 is increased to create the feel of sand.

In some embodiments, the processor 102 may determine the first haptic effect based on if, or how much, the touch surface 116 is flexed, twisted, stretched, or folded. For example, in one such embodiment, if the touch surface 116 is flexed more than 50%, the processor 102 determines a first haptic effect that increases the perceived coefficient of friction at touch surface 116 by 50%. In another such embodiment, if the touch surface 116 is flexed more than 50%, the processor 102 determines a first haptic effect that comprising a vibration.

In one embodiment, the processor 102 may apply data from a user input to an algorithm to determine a first haptic effect. For example, in some embodiments, a user may input a number as part of a game. In response, the processor 102 determines a first haptic effect wherein the first haptic output device 118 increases a perceived coefficient of friction at the surface of touch surface 116 in an amount that is inversely proportional to the size of a number the user input.

Further, in some embodiments, users may have "haptic profiles" wherein a user can determine and save in memory 104 a "profile" of the haptic effects the user would like associated with particular events. For example, in one embodiment, a user can select from a list of options which haptic effect the user would like associated with a button on a user interface. In some embodiments, the list may comprise, for example, haptic effects such as high coefficient of friction, low coefficient of friction, patterned changes in the coefficient of friction, or textures such as bumpy, rubbery, or smooth. In such embodiments, the processor 102 may consult with the user's haptic profile to determine which first haptic effect to generate. For example, if the user's haptic profile associates interaction with the button with a texture, such as smooth, in response to the user placing a finger over the button, processor 102 may determine a first haptic effect wherein the user perceives a low coefficient of friction on the surface of touch surface 116.

In other embodiments, processor 102 may determine the first haptic effect based on current surface deformations or the current perceived coefficient of friction on the surface of touch surface 116. For example, in some embodiments, the processor 102 may determine a first haptic effect perceivable by the user as a high coefficient of friction. Further, in some embodiments, the processor 102 may determine that the surface of touch surface 116 may already comprise a bumpy texture (e.g., due to surface deformations). Thus, the processor 102 may determine that the first haptic effect need not comprise an increase in a perceived coefficient of friction. This may be because the bumps in the touch surface 116 add enough surface friction to achieve the desired first haptic effect.

The method 900 continues when processor 102 determines a second haptic effect based at least in part on the event 906. In some embodiments, the second haptic effect may comprise a haptic effect configured to be output by haptic output device 120. Haptic output device 120 may comprise one or more smart gels or deformation actuators configured to deform touch surface 116. The processor 102 may rely on programming contained in haptic effect determination module 126 to determine the second haptic effect to output to second haptic output device 120. For example, in some embodiments, haptic effect determination module 126 may comprise a lookup table. In one such embodiment, specific user inputs may be associated with particular haptic effects. For example, in one embodiment, in response to typing the word "up" on a virtual keyboard on the device, the haptic effect determination module 126 associates a haptic effect wherein the haptic output device 120 raises the surface of the touch surface 116.

In some embodiments, the lookup table may comprise data associated with features of a user interface and a plurality of available haptic effects. For example, in some embodiments, the lookup table may comprise data associated with user interactions with a user interface, such as sliding a user's finger over a virtual button, and a plurality of available haptic effects. For example, in some embodiments, in response to a user sliding a finger over a virtual button, the processor 102 may consult the lookup table. Based on the lookup table, the processor 102 may determine a second haptic effect to be output by the second haptic output device 120 in which the touch surface 116 is raised to simulate borders of the button.

In some embodiments, a second haptic effect may be associated with the virtual terrain that a character in the game is passing over. For example, in one embodiment, a second haptic effect is associated with rocks over which the character in the video game is walking. In such an embodiment, the processor 102 may determine a second haptic effect wherein the second haptic output device 120 raises and lowers the surface of touch surface 116 to create the feel of rocks.

In some embodiments, processor 102 may determine the second haptic effect based on if or how much the touch surface 116 is flexed, twisted, stretched, or folded. For example, in some embodiments, if the touch surface 116 is flexed more than 50%, processor 102 generates a haptic effect that increases the size of a bump on the touch surface 116 by 50% of the original size. In some embodiments, if the touch surface 116 is flexed more than 50%, processor 102 generates a haptic effect comprising a vibration.

In one embodiment, the processor 102 may apply data from a user input to an algorithm to determine a second haptic effect. For example, in one such embodiment, a user may input a number as part of a game. In response, the processor 102 determines a second haptic effect wherein the second haptic output device 120 raises the surface of touch surface 116 in millimeters in an amount that is proportional to the size of a number a user input.

Further, in some embodiments, user's may have "haptic profiles" wherein a user can determine and save in memory 104 a "profile" of the haptic effects the user would like associated with particular events. For example, in some embodiments, a user can select from a list of options which haptic effect the user would like associated with a button on a user interface. In some embodiment, the list may comprise, for example, haptic effects such as bumpy, smooth, or wavy. In such embodiments, processor 102 may consult with the user's haptic profile to determine which second haptic effect to generate. For example, if the user's haptic profile associates interaction with the button with a texture, such as bumpy, in response to the user placing a finger over the button, the processor 102 may generate a second haptic effect wherein the user perceives bumps at the surface of touch surface 116.

In other embodiments, processor 102 may determine the second haptic effect based on the first haptic effect. For example, if the first haptic effect comprises a high coefficient of friction, processor 102 may determine the second haptic effect should comprise low surface stiffness to create a composite ripple haptic effect. Similarly, processor 102 may determine the second haptic effect based on current surface deformations or the perceived coefficient of friction on the surface of touch surface 116. In some embodiments, for example, processor 102 may determine that because the surface of touch surface 116 already has been deformed to contain a bump, the second haptic effect need not change anything, and thus no second haptic effect needs to be determined.

In some embodiments, processor 102 may determine the second haptic effect based on the characteristics of haptic output device 120. In some embodiments, haptic output device 120 comprises smart gel and a conductor for emitting heat. In such embodiments, processor 102 may base its second haptic effect determination on one or more of the type of smart gel, the type of conductor, the effect to be generated, and how much heat must be generated to output a specific effect. In other embodiments, haptic output device 120 may comprise a deformation actuator coupled to an arm that rotates a deformation component. In such embodiments, processor 102 may base its second haptic effect determination on one or more of the type of deformation actuator, the location of the deformation component, the effect to be generated, and how much the deformation component must be rotated to output a specific effect.

In some embodiments, processor 102 may determine a composite haptic effect comprising the first haptic effect and the second haptic effect. In some embodiments, processor 102 may determine the composite haptic effect in response to an event. Based on the determined composite haptic effect, processor 102 may determine the first haptic effect and the second haptic effect that, in combination, create the perception of the composite haptic effect. For example, in one embodiment, in response to a user sliding a finger over a virtual button, the processor 102 determines a composite haptic effect, for example, comprising a rubber button texture. In such an embodiment, based on the composite haptic effect, the processor 102 determines a first haptic effect, such as a rubber texture, and a second haptic effect, such as the border of a button, that in combination create the feel of the composite haptic effect, a rubber button. As another example, in response to a user sliding a finger over a virtual image of a road, in one embodiment, the processor 102 determines a composite haptic effect, for example, comprising a bumpy texture. In such an embodiment, based on the composite haptic effect, the processor 102 determines a first haptic effect, such as a bumpy texture, and a second haptic effect, such as a vibration, that in combination create the feel of the composite haptic effect, a bumpy road.

The method 900 continues when processor 102 determines a degree of flexing of a deformable surface. In some embodiments, the processor 102 may determine if, or how much, the touch surface 116 or computing device 101 is flexed, twisted, stretched, or folded.

The method 900 continues when processor 102 changes the first haptic effect, the second haptic effect, or both based on at least one of the degree of flexing, the size of a surface contact area, or the position of a detected user interaction. For example, in some embodiments, based on the event, the processor 102 may determine a first haptic effect comprising an increase in a perceived coefficient of friction. Further, in some embodiments, the processor 102 may change the first haptic effect based on if, or how much, the touch surface 116 is flexed, twisted, stretched, or folded. For example, in some embodiments, in response to flexing or bending the computing device 101 and/or touch surface 116, the processor 102 may change the first haptic effect from an increase in a perceived coefficient of friction to a simulated texture. In other embodiments, in response to decreased contact surface area between the user's finger and the touch surface 116, the processor 102 may increase the magnitude of the first haptic effect. In some embodiments, increasing the magnitude of the first haptic effect may counteract the effects of decreasing contact surface area between the user's finger and the touch surface 116 on the strength of the haptic effect perceived by the user.

The method 900 continues when processor 102 receives a signal from a sensor 130 configured to detect an environmental characteristic or biological information 912. The sensor 130 is configured to transmit a sensor signal to the processor 102. In some embodiments, the environmental characteristic may comprise one or more of humidity, temperature, or the amount of ambient light. In some embodiments, the biological information may comprise one or more of a heart rate, respiration rate, body temperature, or biorhythm.

The method 900 continues when processor 102 changes the first haptic effect, the second haptic effect, or both based on the signals from sensor 130. For example, in some embodiments, a user may be interacting with computing device 101. In some embodiments, as the user interacts with the computing device 101, the sensor 130 may detect the user's heart rate. The sensor 130 transmits a sensor signal associated with the user's heart rate to processor 102. The processor 102 may change, based on the sensor signal, the first haptic effect, the second haptic effect, or both. For example, in some embodiments, a user may be playing a physical fitness video game. As part of a forearm exercise in the game, the user may need to rapidly flex the computing device 101 up and down. The sensor 130 may detect the user's heart rate and/or respiration rate and transmit a sensor signal associated with the heart rate and/or respiration rate to the processor 102. In some embodiments, the processor 102 may output a second haptic effect configured to resist against the user flexing the computing device 101. Further, in some embodiments, the processor 102 may change (e.g., decrease) the amount of resistance to be output via the second haptic effect based on the user's heart rate and/or respiration rate.

The method 900 continues when processor 102 transmits a first haptic signal associated with the first haptic effect to first haptic output device 916, which outputs the haptic effect. In some embodiments, the processor 102 may access drive signals stored in memory 104 and associated with particular haptic effects. In some embodiments, a signal may be generated by accessing a stored algorithm and inputting parameters associated with an effect. For example, in some embodiments, an algorithm may output data for use in generating a drive signal based on amplitude and frequency parameters. As another example, a haptic signal may comprise data sent to an actuator to be decoded by the actuator. For instance, the actuator may itself respond to commands specifying parameters such as amplitude and frequency.

The method 900 continues when processor 102 transmits a second haptic signal associated with the second haptic effect to a second haptic output device 918, which outputs the second haptic effect 618. In some embodiments, the processor 102 may access drive signals stored in memory 104 and associated with particular haptic effects. In some embodiments, a signal may be generated by accessing a stored algorithm and inputting parameters associated with an effect. For example, in some embodiments, an algorithm may output data for use in generating a drive signal based on amplitude and frequency parameters. As another example, a haptic signal may comprise data sent to an actuator to be decoded by the actuator. For instance, the actuator may itself respond to commands specifying parameters such as amplitude and frequency.

In some embodiments, processor 102 may determine a composite haptic effect comprising a first haptic effect and a second haptic effect. In such embodiments, the processor 102 may create the composite haptic effect by transmitting the second haptic signal associated with the second haptic effect to haptic output device 120. For example, processor 102 may determine a composite haptic effect comprising a wave on the surface of touch surface 116. To create the composite haptic effect, processor 102 may determine a second haptic effect comprising decreasing the stiffness of the surface of touch surface 116. In some embodiments, processor 102 may transmit a second haptic signal associated with a second haptic effect to second haptic output device 120, which outputs the second haptic effect. In one such embodiment, the user may perceive decreased tension at the surface of touch surface 116. When combined with a first haptic effect that increases the coefficient of friction at the surface of touch surface 116, the decreased stiffness may cause material from deformable touch surface 116 to accumulate in front of the user's moving finger, forming a wave in the touch surface 116.

Figure 10:
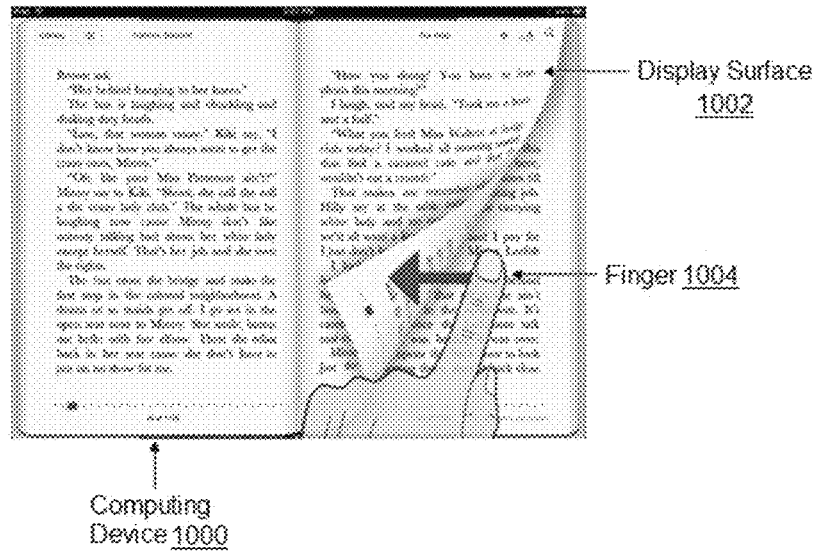
FIG. 10 shows one embodiment of a user interaction with a haptically-enabled deformable surface.

Additional Embodiments of Systems for Enabling Haptic Feedback on a Deformable Surface FIG. 10 shows one embodiment of a user interaction with a haptically-enabled deformable surface. In this example, a computing device 1000 comprises an e-reader or a tablet. The computing device 1000 comprises an application (e.g., a reading application). In some embodiments, the computing device 1000 may output a haptic effect associated with the operation of the device and/or the application. For example, as a user swipes a finger 1004 from the right side of the display surface 1002 to the left side of the display surface 1002 (e.g., to change the page of a book output by a reading application), the computing device 1000 may output a haptic effect. For example, the computing device 1000 may output a haptic effect simulating the feel of turning the page in a paper book. In such an embodiment, the computing device 1000 may output one or more haptic effects configured to simulate the feeling of a wave formed in the page of a book when a page is turned.

In some embodiments, the computing device 1000 may output one or more haptic effects with characteristics based on the characteristics of an object in real space. For example, in some embodiments, the computing device 1000 may vary the characteristics of the haptic effect based on the kind of paper (e.g., the roughness, texture, stiffness, or elasticity of the paper) on which the original book was printed. For instance, if the original book was printed on parchment paper, the computing device 1000 may output a haptic effect wherein the wave formed is not as significant, because parchment paper is more rigid. In some embodiments, to simulate a wave formed in parchment paper, computing device 1000 may output a first haptic effect configured to increase the perceived coefficient of friction between the user's finger 1004 and the display surface 1002, or output a texture configured to simulate that of parchment paper. The computing device 1000 may further output a second haptic effect configured to decrease the stiffness of the display surface 1002 to further simulate the texture of parchment paper. As the user moves a finger 1004 from the right side of the display surface 1002 to the left side of the display surface 1002, a small wave or bump may form as a small amount of material from the deformable display surface 1002 accumulates in front of the user's moving finger 1004. In some embodiments, this may simulate the feeling of a parchment page turning, e.g., a parchment page in a paperback book.

In another embodiment, computing device 1000 may be configured to output haptic effects configured to simulate a texture similar to that of computer printer paper. For example, in some embodiments, the computing device 1000 may output a first haptic effect configured to vary the perceived coefficient of friction. The computing device 1000 may also output a second haptic effect configured to decrease the stiffness of the surface of the display surface 1002. In some embodiments, as the user moves a finger 1004 from the right side of the display surface 1002 to the left side of the display surface 1002, a wave or bump may form as material from the deformable display surface 1002 may accumulate in front of the user's moving finger 1004. In some embodiments, this may simulate the feeling of a page printed on computer printer paper turning. In some embodiments, due to the difference in the texture of printer paper versus parchment paper, the wave or bump may be larger than in the embodiment described above with regard to simulating the texture of parchment paper.

Figure 11:
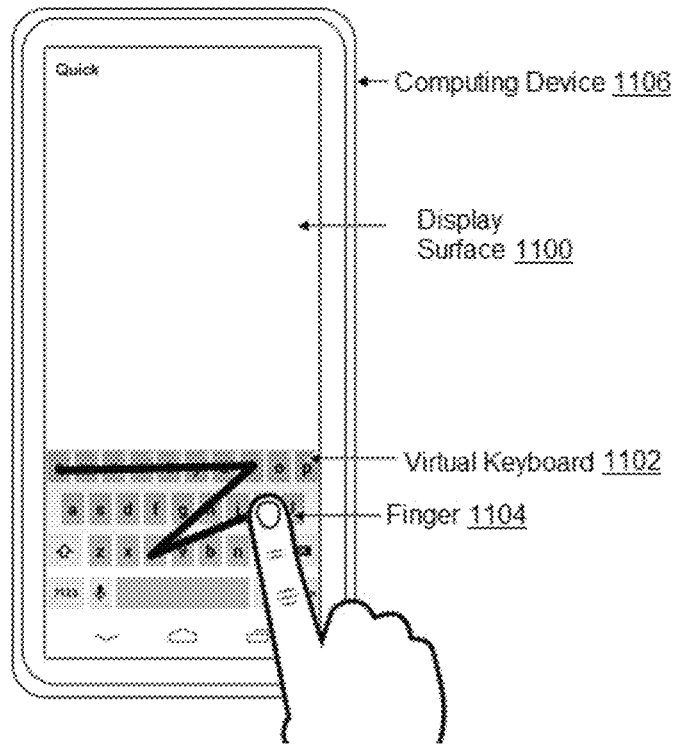
FIG. 11 shows another embodiment of a user interaction with a haptically-enabled deformable surface.

FIG. 11 shows another embodiment of a user interaction with a haptically-enabled deformable surface. In this example, computing device 1106 comprises a smartphone with a touchscreen display. A virtual keyboard 1102 is shown on the display surface 1100. In some embodiments, a user may wish to enter text for a text message via the virtual keyboard 1102. In some embodiments, the virtual keyboard 1102 may be "swipe" enabled, in which the user can input words by sliding a finger along the virtual keyboard from the first letter of a word to its last letter, lifting a finger only between words.

In some embodiments, the computing device 1106 may output one or more haptic effects in response to a user interaction with the computing device 1006 and/or the display surface 1100. For example, in some embodiments, as the user moves a finger 1104 along the letters of the virtual keyboard 1102, the computing device 1106 may output a composite haptic effect comprising three haptic effects. In some embodiments, the first haptic effect may comprise an ESF haptic effect configured to simulate the feeling of interacting with each key (e.g. a finger rubbing on a single key). The second haptic effect may comprise a deformation-based haptic effect configured to simulate the edges of the keys. The third haptic effect may comprise a deformation-based haptic effect configured to simulate the keys being pushed as the user interacts with the keys. For instance, in some embodiments, the composite haptic effect may comprise a metal button. In some embodiments, the computing device 1106 may output an ESF-based first haptic effect configured to simulate the texture of metal. The computing device 1106 may output a deformation-based second haptic effect to simulate the transitions between buttons. Further, the computing device 1106 may output a deformation-based third haptic effect to simulate pushing the keys down. Combined, the user may perceive metal buttons as the user swipes a finger 1104 over the display surface 1100.

In some embodiments, the computing device 1106 may output haptic effects to provide information to a user. For example, in some embodiments, the computing device 1106 may alter the perceived coefficient of friction on the display surface 1100 and/or deform (e.g., raise or lower) the display surface 1100 over certain keys in the virtual keyboard 1102, for example, vowels. In such an embodiment, the user may be able to perceive that a finger 1104 is touching a key, e.g. a vowel, without looking at the screen. For example, in some embodiments, the computing device 1106 may increase the perceived coefficient of friction on display surface 1100 and also raise the display surface 1100 over vowels. As the user interacts with the virtual keyboard 1102, the user may perceive features over the vowels, such as bumps, waves, textures, or ridges, which the user would not otherwise perceive without the haptic effects. In some embodiments, this may alert the user that the user's finger is touching a vowel.

Figure 12A:
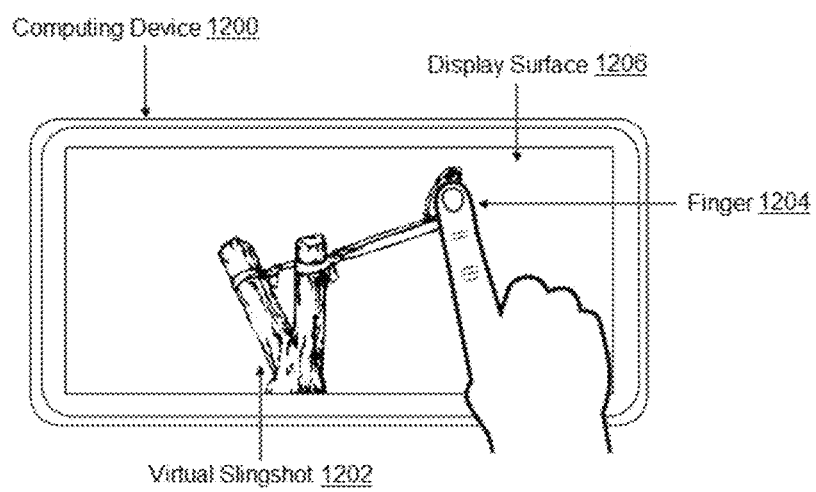
FIG. 12A shows a user interaction with a haptically-enabled deformable surface according to one embodiment.
Figure 12B:
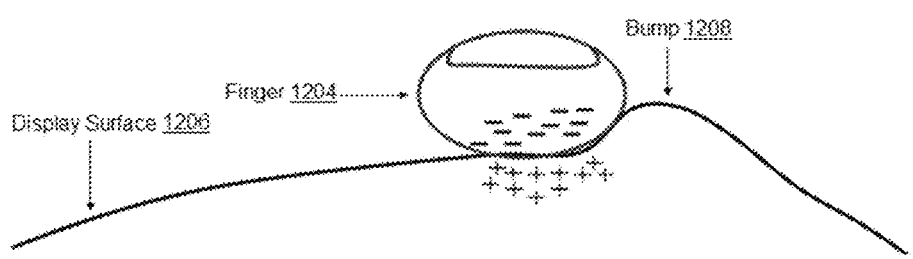
FIG. 12B shows another view of the embodiment of a user interaction with a haptically-enabled deformable surface.

FIG. 12A shows a user interaction with a haptically-enabled deformable surface according to one embodiment. In some embodiments, the computing device 1200 may output one or more haptic effects associated with a program or game. In the embodiment shown in FIG. 12A, the user is playing a game associated with a virtual slingshot 1202. In some embodiments, as the user tightens the virtual slingshot 1202, computing device 1200 may output one or more haptic effects, for example, haptic effects configured to simulate an increase in tension. In one embodiment, the computing device 1200 outputs a haptic effect comprising a perceived increase in the coefficient of friction at the display surface 1206 and a surface deformation in which the surface of the display surface 1206 is raised. In some embodiments, as the user moves a finger 1204 across the display surface 1206 to tighten the virtual slingshot 1202, the computing device 1200 increases the perceived coefficient of friction and raises a portion of the display surface 1206, forming a bump 1208 as shown in FIG. 12B. As the user's finger 1204 pushes against the bump 1208, the user may perceive a feeling of increased tension (i.e., increased resistance against movement). In some embodiments, the computing device 1200 may increase the perceived coefficient of friction and/or the stiffness of the bump such that the user may be prevented from moving the bump 1208 further. In some embodiments, preventing the user from moving the bump 1208 further may indicate to the user that the user has reached a maximum tension level.

In some embodiments, the computing device 1200 may vary the characteristics of the haptic effect as the user interacts with the computing device 1200. In some embodiments, the computing device 1200 may vary the feeling of tension by decreasing the perceived coefficient of friction or lowering the raised portion of the display surface 1206. For example, in some embodiments, if the user moves a finger towards the slingshot's frame to loosen the tension in the virtual slingshot 1202, computing device 1200 may decrease the perceived coefficient of friction at display surface 1206.

The decreased coefficient of friction may cause the size of the bump 1208 formed in the display surface 1206 to decrease. The user may perceive the reduction in the size of the bump as a decrease in the tension of the virtual slingshot 1202.

As another example, in some embodiments, as the user moves a finger 1204 toward the slingshot's frame to loosen the tension in the virtual slingshot 1202, computing device 1200 may increase the surface stiffness on the surface of display surface 1206. The increased surface stiffness may cause the size of the bump 1208 formed in the display surface 1206 to decrease. The user may perceive the reduction in the size of the bump as a decrease in the tension of the virtual slingshot 1202.

In other embodiments, computing device 1200 may output haptic effects based on the characteristics of a virtual object. For example, in the embodiment shown in FIG. 12, the computing device 1200 may vary the perceived coefficient of friction or the deformation on the surface of display surface 1206 based on the virtual materials within the virtual slingshot 1202. For instance, in one embodiment, the virtual slingshot's 1202 elastic material comprises virtual vulcanized natural rubber. In some embodiments, as the user interacts with the virtual slingshot 1202, the computing device 1200 may output a haptic effect with a significantly higher perceived tension than if the virtual slingshot's 1202 elastic material comprised a different virtual material, such as cotton. Likewise, the computing device 1200 may vary the haptic effect based on the material of the frame of the virtual slingshot 1202. For example, in some embodiments, as the user interacts with the virtual slingshot 1202, computing device 1200 outputs a haptic effect with a lower perceived tension if the virtual slingshot's 1202 frame is made from virtual metal rather than virtual wood. In some embodiments, this may simulate the difference in the pliability of metal versus wood.

Advantages of a Haptically-Enabled Deformable Surface

There are numerous advantages to enabling haptic feedback on deformable surfaces. Such systems may allow the user to make a state determination (e.g., determine the mode a device is in) without looking at the device. Thus, the user may be able to maintain focus on other tasks. For example, a user may be able to make determinations with regard to available operations in a program or on a user interface, without having to visually focus on the display. Similarly, a haptic effect may serve as a confirmation that an operation is available, has been completed, or is of a certain level of importance.

In other embodiments, haptically-enabled deformable surfaces may enable a user to use software and user interfaces more effectively. For example, in some embodiments, deformation-based haptic feedback may assist or resist against a user performing certain functions. For instance, in some embodiments, deformation-based haptic feedback may assist a user in bending or folding a computing device to provide input, or resist against the user bending or folding the computing device if the user is not allowed to provide input at that time.

In some embodiments, haptically-enabled deformable surfaces may provide a more realistic or immersive user experience. For example, in some embodiments, a user playing a game on a deformable surface may receive haptic feedback associated with game events, making the game more realistic and enjoyable.

Further, in some embodiments, haptically-enabled deformable surfaces may allow deformable surfaces to replace conventional switches. This may allow deformable surfaces to operate as multifunction controllers and/or to be used in previously unused places. In some embodiments, using deformable surfaces as multifunction controllers or in previously unused places may reduce costs and increase overall user satisfaction.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may comprise computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:
1. A system comprising:
a first haptic output device configured to receive a first haptic signal and output a first haptic effect comprising an electrostatic friction haptic effect to a deformable surface by generating an electrostatic force between the first haptic output device and an object contacting the deformable surface;

a second haptic output device configured to receive a second haptic signal and output a second haptic effect configured to deform the deformable surface; and a processor coupled to the first haptic output device and the second haptic output device, the processor configured to:

determine an event;

determine a composite haptic effect based at least in part on the event, the composite haptic effect comprising a change in a coefficient of friction and a change in a stiffness of the deformable surface; and transmit the first haptic signal to the first haptic output device and the second haptic signal to the second haptic output device, the first and second haptic signals configured to cause the first and second haptic output devices to generate the composite haptic effect.

2. The system of claim 1, wherein the deformable surface comprises a display.

3. The system of claim 2, wherein the display comprises a rollable display, a foldable display, or a bendable electronic paper.

4. The system of claim 1, wherein the first haptic output device comprises an electrostatic device.

5. The system of claim 4, wherein the first haptic effect comprises a vibration, a perceptible change in a coefficient of friction of the deformable surface, or a simulated texture.

6. The system of claim 4, wherein the electrostatic device is embedded within the deformable surface.

7. The system of claim 1, wherein the second haptic output device comprises a smart gel, a deformation actuator, a rotating/linear actuator, a solenoid, an electroactive polymer actuator, a surface reconfigurable haptic substrate, a magnetorheological or electrorheological fluid, a macro fiber composite, an air or fluid pocket, a resonant mechanical element, a piezoelectric material, a micro-electromechanical element or pump, a thermal fluid pocket, or a variable porosity membrane.

8. The system of claim 1, wherein the processor is further configured to determine a degree of flexing of the deformable surface.

9. The system of claim 8, wherein the processor is further configured to change the composite haptic effect based on at least one of the degree of flexing in the deformable surface, the size of a surface contact area, or the position of the detected user interaction.

10. The system of claim 1, wherein the processor is further configured to:

receive a sensor signal from a sensor configured to detect an environmental characteristic or biological information and transmit the sensor signal associated with the environmental characteristic or biological information, wherein the environmental characteristic comprises one or more of humidity, temperature, or the amount of ambient light, and the biological information comprises one or more of a heart rate, respiration rate, body temperature, or biorhythm; and generate the first haptic effect or the second haptic effect based on the sensor signal.

11. The system of claim 1, wherein the composite haptic effect is configured to produce a wave in the surface of the deformable surface.

12. The system of claim 1, wherein the composite haptic effect is configured to cause a material of the deformable surface to accumulate in response to a movement of a body part along the deformable surface.

13. The system of claim 1, wherein the composite haptic effect comprises an increase in the coefficient of friction and a decrease in the stiffness of the deformable surface.

14. The system of claim 1, wherein the composite haptic effect comprises an decrease in the coefficient of friction and an increase in the stiffness of the deformable surface.

15. The system of claim 1, wherein the processor is further configured to:

transmit a third haptic signal to the second haptic output device, the third haptic signal configured to cause the deformable surface to bend around and couple to a body part for use as a wearable device.

16. The system of claim 1, wherein the composite haptic effect is configured to simulate tension associated with a virtual object.

17. A method comprising:

determining an event;

determining a composite haptic effect based at least in part on the event, the composite haptic effect comprising a change in a coefficient of friction and a change in a stiffness of a deformable surface;

transmitting a first haptic signal configured to cause a first haptic output device to generate the change in the coefficient of friction by generating an electrostatic force between the first haptic output device and an object contacting the deformable surface; and transmitting a second haptic signal configured to cause a second haptic output device to output a second haptic effect comprising the change in the stiffness of the deformable surface;

wherein the first and second haptic signals are configured to cause the first and second haptic output devices to generate the composite haptic effect.

18. The method of claim 17, wherein the second haptic effect comprises deforming the shape of the deformable surface.

19. A non-transient computer readable medium comprising program code, which when executed by a processor is configured to cause the processor to:

determine an event;

determine a composite haptic effect based at least in part on the event, the composite haptic effect comprising a change in a coefficient of friction and a change in a stiffness of the deformable surface;

transmit a first haptic signal configured to cause a first haptic output device to generate the change in the coefficient of friction by generating an electrostatic force between the first haptic output device and an object contacting the deformable surface; and transmit a second haptic signal configured to cause a second haptic output device to output a second haptic effect comprising the change in the stiffness of the deformable surface;

wherein the first and second haptic signals are configured to cause the first and second haptic output devices to generate the composite haptic effect.

20. The non-transient computer readable medium of claim 19, further comprising program code, which when executed by a processor is configured cause the processor to determine a degree of flexing of the deformable surface.

* * * * *